United States Patent [19]

Klinner

[11] Patent Number: 4,671,051

[45] Date of Patent: Jun. 9, 1987

[54] CROP ENGAGING APPARATUS AND METHODS

[75] Inventor: Wilfred E. Klinner, Milton Keynes, England

[73] Assignee: National Research Development Corporation, London, England

[21] Appl. No.: 737,898

[22] Filed: May 24, 1985

Related U.S. Application Data

[63] Continuation of Ser. No. 378,392, May 14, 1982, abandoned.

[30] Foreign Application Priority Data

May 15, 1981 [GB] United Kingdom ............... 8114981

[51] Int. Cl.⁴ .................................. A01D 82/00
[52] U.S. Cl. ..................... 56/16.4; 56/192; 56/DIG. 1
[58] Field of Search ............. 56/16.4, 1, DIG. 1, 56/192

[56] References Cited

U.S. PATENT DOCUMENTS

| | | | |
|---|---|---|---|
| 2,513,155 | 6/1950 | Dvorak | 56/1 |
| 2,869,657 | 1/1959 | Harrop | 56/400 |
| 3,151,436 | 10/1964 | Johnston | 56/400 |
| 3,596,445 | 8/1971 | Lievers et al. | 56/14.5 |
| 3,676,988 | 7/1972 | Hauser-Lienhard | |
| 3,716,972 | 2/1973 | Case et al. | 56/1 |
| 4,021,995 | 5/1977 | Hill | 56/1 |
| 4,182,102 | 1/1980 | Andersen et al. | 56/364 |

FOREIGN PATENT DOCUMENTS

| | | | |
|---|---|---|---|
| 1187943 | 9/1959 | France | 56/1 |
| 359558 | 2/1962 | Switzerland | 56/1 |
| 198256 | 5/1923 | United Kingdom | 56/400 |
| 1322165 | 7/1973 | United Kingdom | 56/1 |
| 1400055 | 7/1975 | United Kingdom | 56/1 |
| 1493574 | 11/1977 | United Kingdom | 56/1 |
| 1527518 | 10/1978 | United Kingdom | 56/1 |
| 2056835 | 3/1981 | United Kingdom | 56/1 |

OTHER PUBLICATIONS

Aspirofane/Fan Ted Leaflet, Mar. 1966.
Vicon-Lely Aspirofane plus translation—1965.
Vicon, un nouvel appareil dans la gamme vicon la seule faucheuse prefaneuse rotative—1968.
Vicon-Lely Fan-Ted Air-Flow Action Tedder.
Save Seed with the Murphy Pick-Up, Turneys, Quinton Green, Northampton.
Del pick ups, Drinnan Engineering Limited, Christchurch, New Zealand.

Primary Examiner—Robert Peshock
Assistant Examiner—John G. Weiss
Attorney, Agent, or Firm—Cushman, Darby & Cushman

[57] ABSTRACT

A crop engaging device for conveying and/or treating crop comprises a support and a plurality of crop engaging elements extending outwardly from the base. The device may be a stationary array of elements protruding into a crop flow, or a rotor which may be driven to convey or retard crop, or may be freely rotating. The crop engaging elements may be outwardly extending fins, or transversely extending ribs, or discs perpendicular to the axis of rotation. The crop engaging elements may have specified yielding characteristics, being yieldable in a preferred direction and being yieldable predominantly at a region spaced from the outer tip. Each fin may be inclined relative to the direction of crop flow to impart lateral movement to the crop. Two cooperating rotors may have crop engaging elements which intermesh so that ribs or discs on one rotor press crop onto sharp tips of brushes or fins on the other rotor to condition the crop. Transverse ribs may be radially sprung to avoid damage. Outwardly extending fins may have reclined, stepped profiles to improve crop engagement and release.

2 Claims, 50 Drawing Figures

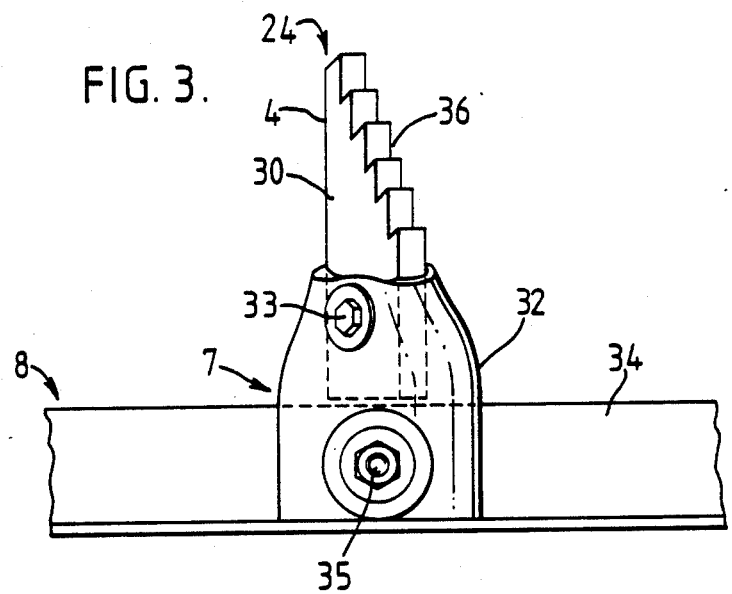
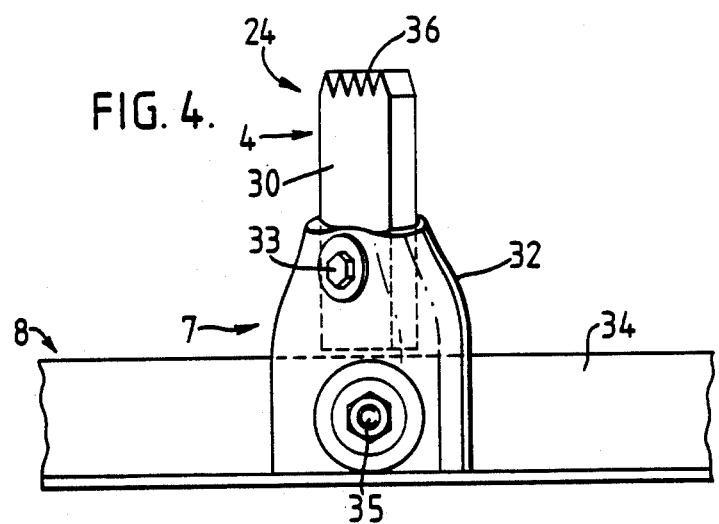

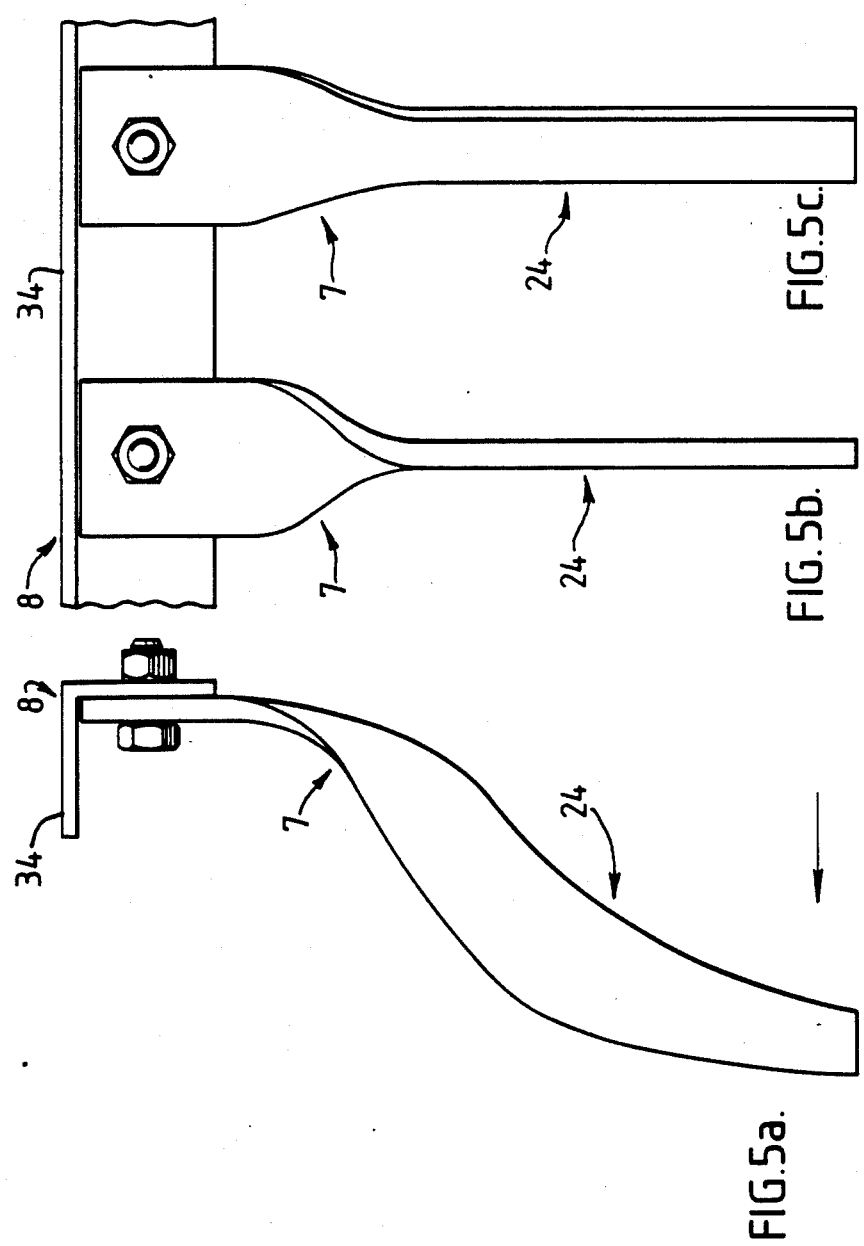

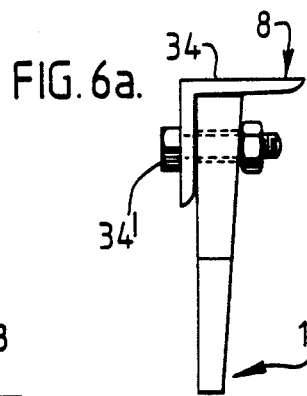
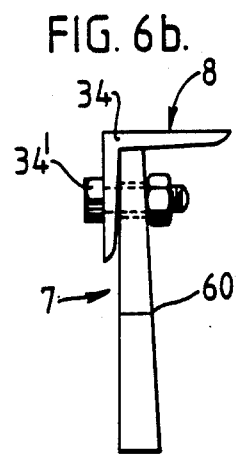
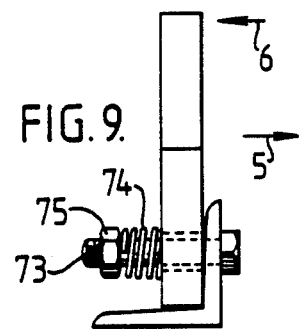
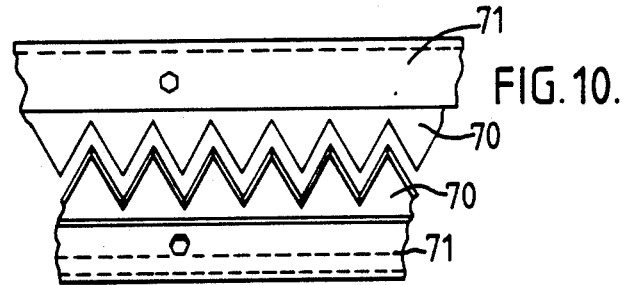

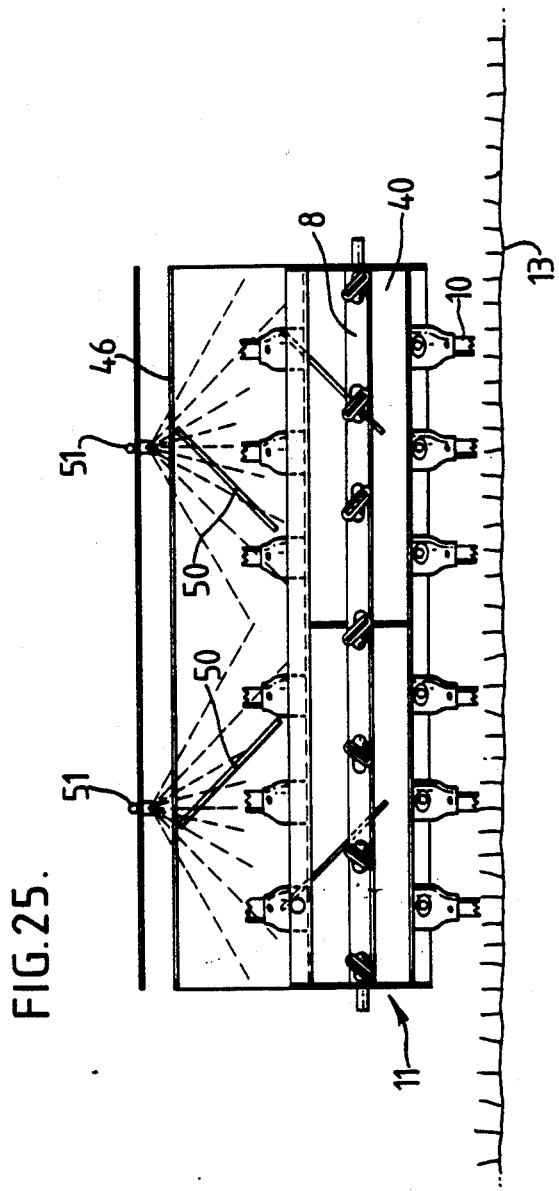

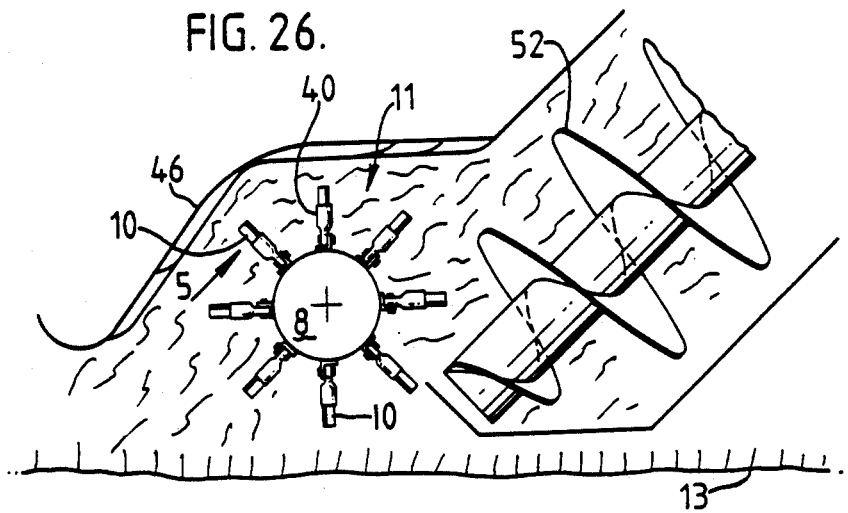
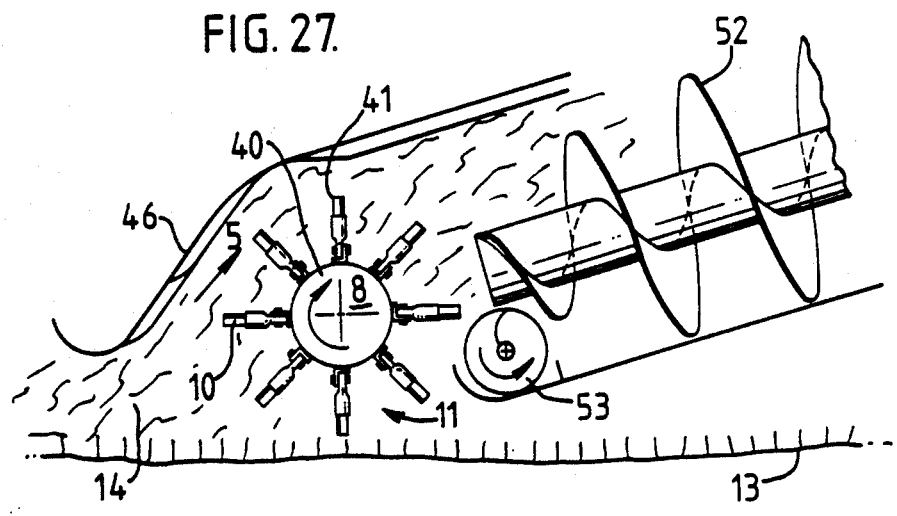

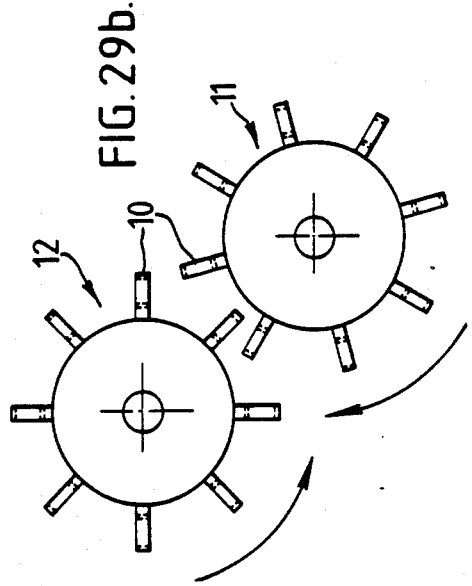
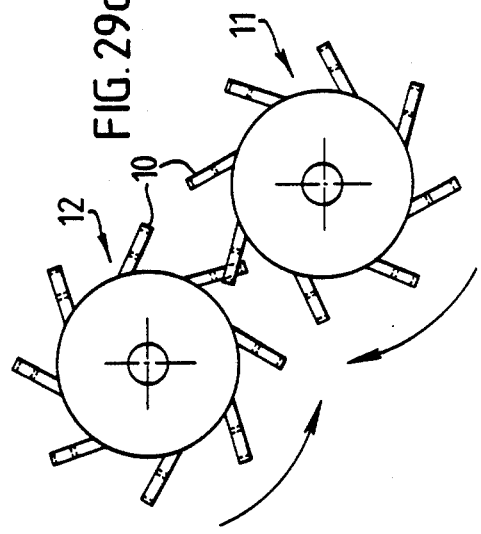
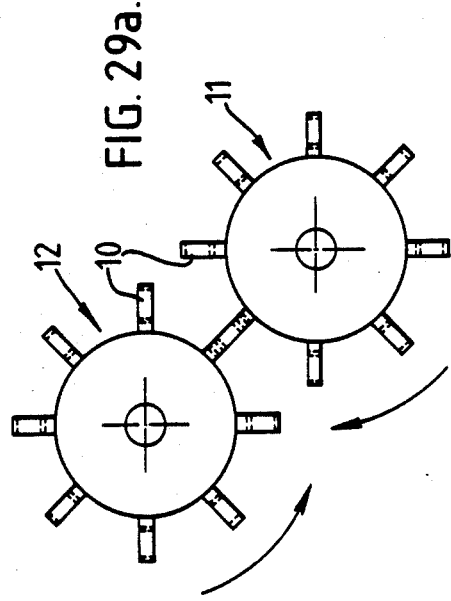
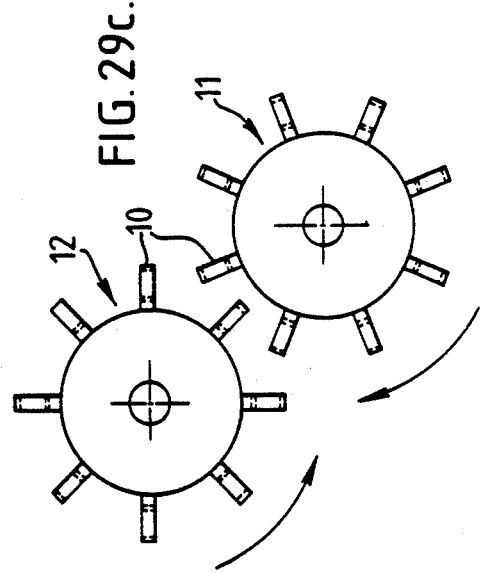

CROP ENGAGING APPARATUS AND METHODS

This is a continuation of application Ser. No. 378,392, filed May 14, 1982, which was abandoned upon the filing hereof.

The present invention relates to crop engaging devices, apparatus and methods. The invention is concerned in one aspect with apparatus for conditioning of crops especially, but not exclusively, grasses, and is concerned in other applications with pick-up and conveying rotors for collecting cut crop and conveying the same.

Considering firstly the aspect of the present invention concerned with conditioning of crops, it is well known to treat forage crops such as grasses and legumes in order to assist loss of moisture in the field after cutting prior to storage to provide animal fodder. The speed at which surface and sap moisture evaporate from the cut crop during field exposure depends inter alia on the physical condition of the crop. The principle barrier to moisture loss is the cuticle and the layer of epicuticular wax on the crop surface, and it is now common practice in agriculture to mechanically treat the crop in order to damage this barrier. Such mechanical treatment, which may take the form of crushing, lacerating, bruising, splitting, spiking, bending or scuffing the siems and leaves of the crop, is known as "conditioning". In our published pending UK patent Application No. 8012426, publication No. 2041713, there are set out the advantages of conditioning by methods which cause predominantly surface damage to the crop, and the present invention in some aspects is concerned with improvements in such conditioning by surface damage, and optionally more deep seated damage applied to the crop as longitudinal scratches or lesions, or as localised spike pricks.

In the aforesaid prior patent application there is disclosed a form of crop conditioning device comprising a brush-like structure having a multiplicity of stiff, resilient, elongate conditioning elements for conditioning crop by relative movement between the conditioning elements and the crop by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements.

Typically such a conditioning rotor consists of a brush of synthetic plastics brush elements, also referred to as filaments, conveniently arranged in tufts having a degree of randomness of elements within each tuft, although in some aspects there are described conditioning devices in which the conditioning elements are arranged regularly.

In one aspect, the present invention is concerned with more effective and optionally more severe forms of conditioning devices, and with new combinations of conditioning devices, and other crop engaging devices.

Considering now a second aspect of the invention concerned with pick-up rotors for collecting cut crop, and conveying rotors for crop in general, there have been known previously a number of forms of crop conveying rotors having outwardly directed crop conveying elements. One form of such crop conveying elements has been provided by rotors enerally in the form of paddle wheels with flat rib-like conveying elements extending transversely across the width of the conveying rotor. Such paddles were sometimes straight edged, and sometimes shaped with serrations or other patterns. Examples of previous disclosures of such rotors are to be found in U.S. Pat. No. 3,676,988 (Bucher-Guyer) which shows in FIG. 9 a horizontal conditioning rotor provided with beater bars 4b formed with saw-teeth shaping. Another prior patent, UK Pat. No. 1140284 (Landbruksteknisk) shows in FIG. 2 at 15 a feed roller the free edges of which are said to be preferably waved or saw-toothed. Also in UK Pat. No. 1214840 (Vissers) there is disclosed a paddle wheel type of conveying rotor which it is said may be made of sheet metal or of synthetic plastics material, rubber or like flexible elastic material.

As has been mentioned, our own previously published UK pending patent Application No. 8012426 shows pick-up and conveying rotors including outwardly directed crop engaging elements, which may be formed of synthetic plastics material.

In our prior granted UK Pat. No. 1322165, before amendment, there is disclosed in FIGS. 1 to 3 a crop conditioning device in which a rotor has a number of outwardly directed conditioning elements formed of lengths of rubber regularly disposed about the axis of the rotor In a second main aspect, the present invention seeks to provide improved forms of crop engaging elements differing from known elements by shape, configuration, or physical properties, or various combinations of these factors.

According to the present invention in a first aspect there is provided a crop engaging device for conveying and/or treating crop, comprising support means, a plurality of outwardly extending crop engaging elements mounted on the support means for engaging crop flowing past, or conveyed by, the device, each crop engaging element having a principal plane which traverses the general direction of crop flow, each crop engaging element being formed of stiff resilient material and being arranged to be yieldable preferentially in a selected preferred direction relative to the general direction of crop flow, the said preferred direction of yielding including at least a component along the direction of principal load on the element due to the crop flow, each crop engaging element being yieldable at least predominantly by yielding movement at a region spaced from the distal, crop-engaging, region of the element, and the yielding arrangement having suifficient stiffness for the elements to be capable of returning after yielding to their undeflected dispositions at least predominantly by virtue of the resilience of the yielding arrangement.

The yielding of the crop engaging elements may be due to the resilient nature of the material from which the elements are formed, or may be due to an additional yielding arrangement by pivoting, springing or otherwise, or may be due to a combination of such yielding effects.

The crop engaging device finds application either when in the form of a rotor for conveying and/or conditioning crop by rotation of the rotor, or when in the form of a stationary element positioned adjacent a crop flow so as to condition the crop being propelled past the device by other means. Where the crop engaging device is in the form of a rotor, the elements may be returned after yielding to their undeflected dispositions by combination of the yielding arrangement together with centrifugal force, and where the crop engaging device comprises a stationary device, the elements may be returned to their undeflected dispositions after yielding by virtue only of the yielding arrangement.

The invention finds particular application where the crop engaging elements are formed of thick stiff resilient and generally flat material (for example thick stiff resilient sheet-like material), conveniently of synthetic plastics material.

The shape of each crop engaging element may vary between a rib-like element extending transversely across the direction of crop flow to a greater extent than it extends outwardly from the support means, for example in the form of an elongate sheet-like member extending across the width of a crop-flow channel. Alternatively each crop engaging element may comprise an outwardly directed fin-like element extending outwardly from the support means to a greater extent than it extends transversely across the direction of crop flow.

In general the invention in this aspect finds application in four main forms, as follows:

(i) a crop engaging device in which the yielding movement of the crop engaging element is provided by a separate mounting means mounting the crop engaging element onto a support, which may be a rotor or a stationary element, such a form being provided for example by a flexible sleeve in which an outwardly directed fin is mounted;

(ii) a crop engaging device in which each crop engaging element comprises an outwardly extending fin in which the plane of the fin is twisted over part of the extent of the fin, the twist of the fin providing a region capable of the required yielding movement;

(iii) a crop engaging device in which each crop engaging element is a flat outwardly directed element generally transverse to the direction of crop flow, and in which the thickness of the flat element is reduced at or near the region where the element is secured to a support such as a rotor or stationary support; and (iv) a crop engaging device in which each crop engaging element comprises a relatively wide generally flat rib (for example a sheet-like member) extending a substantial distance transverse to the direction of crop flow and secured to a support by means allowing a pivoting or rocking motion of the entire sheet-like rib against a spring securing means.

In one aspect the invention may be considered as embracing outwardly directed crop engaging elements ranging in width from a wide sheet-like rib across the width of a crop-flow channel, to a series of outwardly extending fins having a greater outwardly extending length than width transverse to the direction of crop flow, in which where the elements are of greater width, more provision must be arranged for separate yielding means such as pivoting and spring like arrangements to allow a relatively stiff wide rib to pivot, and where the elements tend towards individual outwardly directed fins, less provision need be made for springing and pivoting arrangements, and more yielding effect may be provided by the inherent resilience of the elements themselves.

There will now be set out a number of specific features in accordance with this aspect of the invention which may be preferred or convenient in putting the invention into use.

The said principal plane of each engaging element of the device preferably traverses the general direction of crop flow at an angle in the range 30° to 90°. In some arrangements the said angle may be about 45°, and in others the said angle may be about 90°.

The said preferred direction of yielding of each crop engaging element of the device may be inclined to the direction of principal load on the element due to crop flow at an angle in the range 0° to 45°, and it is preferred that in many arrangements, for example where the elements are wide transverse rib-like elements, that the preferred direction of yielding lies generally along the direction of principal load on the element due to crop flow.

In one particularly preferred form, each crop engaging element of the device may be mounted in and secured to a flexible sleeve, the sleeve being fixedly secured to the said support means of the device and being arranged to allow yielding of the element by flexing of the sleeve.

Conveniently, the crop engaging element may be a generally flat element, and the element may be secured to the sleeve by a first coupling member, such as a bolt, which passes through the sleeve and deforms the sleeve by compressing the walls of the sleeve against the element, the sleeve being secured to the said support means of the device by a second coupling member, such as a further bolt, which passes through the sleeve and deforms the sleeve by compressing the walls of the sleeve against the support means, the said preferential yielding of the crop engaging element being achieved by virtue of the deformation of the sleeve by at least one of the coupling members, usually by a combination of the deformation produced by both coupling members.

In accordance with a further feature, the sleeve may be flattened in a first plane in the region of the said support means of the device by virtue of the securement of the sleeve to the support means, and may be flattened in a second plane in the region of the element by virtue of the securement of the sleeve to the element, the said first plane being inclined relative to the second plane in a disposition equivalent to rotation about an axis generally along the length of the sleeve.

Turning to an alternative general form of the yielding arrangement, each crop engaging element may be secured to the support means of the device by a coupling member, such as a bolt, which allows movement between the element and the support means, for example by the bolt being a loose fit in a hole through the element, there being provided resilient biasing means, such as a spring or flexible bush or washer, which biasses the element towards an outwardly extending operating position, the arrangement allowing yielding of the element by rocking or pivotting movement of the element relative to the support means against the action of the biassing means.

Conveniently, where the element is a generally flat element, the element may be secured to a cooperating flat surface of the support means by the said coupling member, which is grranged to pass through the element, the said resilient biassing means acting to bias the element towards the flat surface and the element being yieldable by a rocking motion away from the flat surface against the effect of the biassing means.

In yet another form of the yielding arrangement, the said preferential yielding of each crop engaging element may be provided by virtue of variation in shape and/or thickness of the element. For example, where each element is a fin-like element having a length in the outward direction from the support means greater than its width transverse to the direction of crop flow, the plane of the fin-like element may be twisted over part of the extent of the element, the twist of the element providing a region capable of a yielding movement which differs directionally from that inherent in the base and tip regions of the element. In another example, each crop engaging element may be a generally flat element having a reduced thickness at or near the region where the element is secured to the support means, the region of reduced thickness providing a required yielding movement.

Where a crop engaging device according to the invention takes the form of a conditioning device, one advantage is that more effective conditioning can be provided by the selective yielding of the elements in a predetermined direction. The conditioning effected can be more severe than has previously been thought to be acceptable, but such severe conditioning is now thought to be acceptable firstly because of good crop alignment which can be achieved with devices according to the invention, which tends to provide longitudinal lesions in the crop rather than fragmentation, and secondly it is thought that fragmentation is more acceptable due to more efficient crop pick-up by pick-up rotors either embodying the present invention, or embodying the invention of our previous co-pending application Ser. No. 8012426.

Another considerable advantage of the present invention lies in the balance between providing adequate protection for the crop engaging elements by allowing yielding in the face of objects more solid than the crop, whilst at the same time retaining the crop engaging elements in the outwardly extended operational position without the need to rely upon centrifugal force. Crop engaging rotors which rely upon centrifugal force to maintain the crop engaging elements in the operative position tend to require fast speeds and, consequently, high power consumption from drive devices. Moreover, the risks of propelling extraneous objects and causing injury and damage are greater.

Another advantage which arises with devices embodying the inventive concepts of the present specification is that there may be provided crop engaging elements of a flat or planar nature in which the principal plane of each element is inclined to the general direction of crop flow.

In accordance with the invention in this aspect, there may be provided a crop engaging device for conveying and/or treating crop, comprising support means, a plurality of outwardly extending crop engaging elements mounted on the support means for engaging crop flowing past, or conveyed by the device, each crop engaging element being a generally flat element formed of stiff resilient material and each element having a principal plane which traverses the general direction of crop flow, each element being arranged to be presented to the crop with its principal plane inclined to the direction of crop flow in such a manner as to impart a lateral movement to crop flowing past or conveyed by the device.

Conveniently the said principal plane of each element traverses the general direction of crop flow at an angle in the range 30° to 60°, for example an angle of about 45°.

In some arrangements a number of succeeding elements presented to the crop along the direction of crop flow have the same sense of inclination, so as to impart an overall movement laterally to crop engaged by the device, or alternatively succeeding elements, or groups of elements, presented to the crop along the direction of crop flow may have alternating directions of inclination so that the overall effect on the crop is merely to move it to and fro laterally without significant overall lateral displacement.

The invention in this aspect has particular application where the device is in the form of a rotor. The principal plane of each crop engaging element may have the required inclination by being inclined to that plane which contains the general direction along which the element extends outwardly, and which contains or is parallel to the axis of rotation of the rotor. It may be arranged that in respect of each element the general direction along which the element extends outwardly lies along a radius of the axis of rotation of the rotor and the principal plane of the element is inclined to a plane containing the said radius and containing the said axis of rotation.

In the aspect being considered, the invention has particular application where each element is a fin-like element having a length in the outward direction from its base greater than its width transverse to the direction of crop flow. In some arrangements the plane of the fin-like element may be twisted over part of the extent of the element.

Each of the inclined crop conveying elements of the device may be mounted in and secured to a flexible sleeve, the sleeve being fixedly secured to the said support means of the device and being arranged to allow yielding of the element by flexing of the sleeve, the said sleeve being flattened in a first plane in the region of the base by virtue of the securement of the sleeve to the support means, and being flattened in a second plane in the region of the element by virtue of the securement of the sleeve to the element, the said first plane being inclined relative to the second plane in a disposition equivalent to rotation about an axis generally along the length of the sleeve, the element being secured to the sleeve by a first coupling member which passes through the sleeve and flattens the sleeve by compressing the walls of the sleeve against the element, and the sleeve being secured to the support means by a second coupling member which passes through the sleeve and flattens the sleeve by compressing the walls of the sleeve against the base.

As is the case with most embodiments of the present invention, it is preferred that each element is formed from thick, stiff, resilient, and generally flat, sheet like material, preferably synthetic plastics material.

In some preferred arrangements each element extends outwardly substantially radially of a rotor, although in other arrangements the element may be inclined to a radius of the rotor.

Optionally the outer end of each element may be serrated. The outer ends may be terminated in a surface generally perpendicular to the longitudinal axis of the fin, or in a surface inclined to the longitudinal axis of the fin, or may be terminated in an arrow shaped point.

In one aspect of the invention, the shape of the outer end of a crop engaging element provides an independent inventive feature which finds application whether or not applied in combination with other features of the invention.

In accordance with this aspect of the invention there is provided a crop engaging device for conveying and- /or treating crop, comprising support means, a plurality of outwardly extending crop engaging elements mounted on the support means for engaging crop flowing past, or conveyed by the device, each crop engaging element being a generally flat element formed of stiff resilient material and each element having a principal plane which is aligned so as to include at least a component along the general direction of crop flow, each element having a profile which includes at the outer end of the element, at least at the leading edge of the element, a series of steps, the element being presented to the crop with each succeeding step in the series positioned at a greater distance from the base of the element than the preceding step.

Preferably the series of steps extends across the whole of the width of the element, leading from one edge of the element to the other, and conveniently the steps are in the form of saw tooth serrations.

This aspect of the invention has particular application where the said principal plane of each element is inclined to the general direction of crop flow at an angle less than 60°, and often the principal plane of the element will be aligned along the general direction of crop flow. Also this aspect is particularly applicable where each element comprises a fin-like element extending outwardly from the base to a greater extent than it extends transversely across the direction of crop flow.

A crop engaging rotor such as has been set out finds application in a number of fields, for example as a pick-up rotor for picking up cut crop from the ground, and-/or as a cro conditioning rotor for effecting conditioning of crop by surface damage to the crop. Such a rotor may be used in isolation or in co-operation with other rotors of the same type, or in co-operation with other conditioning or conveying rotors, or with stationary guide vanes or other crop engaging devices. Indeed it is also within the scope of the invention in this aspect to provide a stationary crop engaging device comprising outwardly extending elements having inclined principal planes, and/or stepped outer ends, in the manner which has been set out.

In accordance with another advantage which may be obtained with the inventive concepts disclosed in this specification, there may be provided a particularly effective form of conditioning by having two co-operating rotors incorporating conditioning elements or other crop treatment elements each having a principal plane transverse to the general direction of crop flow.

According to a general view of this aspect of the present invention there is provided apparatus for treating crop comprising two cooperating rotors mounted for counter rotation about parallel axes for passage of crop between the rotors, at least one rotor comprising a crop treating rotor having a plurality of stiff, resilient, outwardly directed crop engaging elements having sharp tips on the outer ends thereof for treating crop, and the other rotor having a plurality of stiff, resilient, outwardly directed crop engaging elements the arrangement being such that in operation the rotors rotate with the outer perimeters of the rotors overlapping and with regular inter-meshing of crop engaging elements on one rotor with crop engaging elements on the other rotor in such a manner that the crop engaging elements of the said other rotor tend to press crop into gaps between the crop treating elements on the said one rotor which has the sharp tips so that the crop is laid across the outer ends of the elements on the said one rotor for treating the crop at least predominantly by a spiking action.

It is particularly preferred that at least one of the said rotors comprises a crop engaging device having one or more of the inventive features set out hereinbefore or hereinafter, the said one rotor having the sharp tips so that the crop is laid across the outer ends of the elements on the said one rotor for treating the crop at least predominantly by a spiking action.

It may be arranged that only one of the rotors has sharp outwardly directed tips, or each of the rotors may have sharp outwardly directed tips on the outer ends of the crop engaging elements thereof.

In some particularly preferred arrangements, the crop engaging elements of each rotor are arranged in elongate formations which traverse the general direction of crop flow, the arrangement being such that in operation the rotors rotate with the outer perimeters of the rotors overlapping and with regular inter-meshing of one or more of the elongate formations of each rotor with one or more elongate formations o! the other in such a manner that the crop engaging elements of one rotor press crop into gaps between the elongate formations on the other rotor.

In some arrangements, one of said two rotors may be a crop conditioning device comprising a brush-like structure having a multiplicty of stiff, resilient, elongate conditioning elements for conditioning the crop by an action consisting predominantly of surface damage to the crop, the elements being yieldable in response to engagement with the crop, and being yieldable at least predominantly by bending of the elements along at least part of the crop engaging portions of the lengths thereof, and the elements being sufficiently stiff to return to their undeflected dispositions when free from engagement with crop at least predominantly by virtue of the stiffness of the elements and in which each crop engaging element on the other rotor comprises a rib-like element extending transversely across the direction of crop flow to a greater extent than it extends outwardly from the base.

Conveniently one of the rotors may be regarded as a crop treatment rotor and the other rotor can be regarded as a feeding rotor. In one preferred form, each elongate formation on the feeding rotor is formed by a single crop engaging rib-like element, for example which consists of a single sheet of stiff resilient material, conveniently synthetic plastics material. Optionally the distal edge of each crop engaging element on the feeding rotor is serrated or otherwise shaped to assist engagement of crop by the element.

Conveniently the first rotor may comprise a brushlike structure as set out in our co-pending Application No. 8012426, and in one form such a conditioning rotor may consist of a brush of synthetic plastics brush elements. However it will be appreciated that other forms of crop treatment elements may be used, for example each crop treatment element may comprise an outwardly directed elongated fin of sheet material, having the plane of the sheet material generally transverse to the direction of crop flow.

The orientation of the elongate formations on the or both rotors may vary, but embodiments divide generally into two forms, according to whether the elongate formations on the rotors are substantially transverse formations generally along the direction of the axes of rotation of the rotors, or are substantially circumferential formations formed generally in planes transverse to the axis of the rotor, conveniently at right angles to the direction of the axis of the rotor, although in some cases the elongate formations on one rotor may be at right angles to the axis of the rotor, but the elongate formations on the other rotor may be inclined at an angle to the perpendicular to the axis of the rotor. In some embodiments the crop engaging elements may be arranged in rows on one rotor, but may be arranged less uniformly on the other rotor, provided that there are provided appropriate gaps between the crop engaging elements for the required inter-meshing of the two rotors.

Where the said elongate formations on the rotors are substantially circumferential formations formed generally in planes transverse to the direction of the axes of the rotors, it is particularly preferred that the feeding rotor comprises a plurality of disc like members spaced apart along the axis of the rotor, each disc like member forming one of the said elongate formations of the feeding rotor.

There may also be provided apparatus for treating crop including a crop engaging device having any of the preceding features in which the said crop engaging device is in the form of a rotor and there is provided a further crop engaging rotor positioned opposite the first mentioned rotor in cooperation therewith, in which the said further crop engaging rotor comprises a roller for holding crop against the first mentioned crop engaging rotor and for modifying the crop flow between the rotors.

In general, there may be provided crop engaging apparatus as set out hereinbefore in which one of the rotors has crop conditioning elements thereon, and the other rotor acts as a feed rotor for holding crop against the conditioning elements and for modifying the speed of crop flow between the rotors, in which the feed rotor is a freely rotating non-driven rotor, or a braked, non-driven rotor, or in which the feed rotor is a driven rotor driven at a different peripheral speed from and/or in a different direction to the conditioning rotor.

In accordance with a further aspect of the present invention, there may be provided apparatus for treating crop comprising two rotors positioned opposite each other and mounted for counter rotation about parallel axes for passage of crop between the rotors, each rotor having a plurality of outwardly extending crop engaging elements, one rotor comprising a plurality of disc-like elements, constituting the crop engaging elements of that rotor, positioned generally transverse to the axis of rotation of the rotor and spaced apart along the length of the rotor, and a central core of the rotor on which the disc-like elements are mounted and which is of sufficient size to prevent significant wrapping of crop around the core, the rotors being positioned sufficiently closely for one of the rotors to press crop against the other rotor to effect treatment of the crop.

It may be arranged that each, or only one, of the rotors comprises a series of disc-like elements as set out above. Each element on the said other rotor may comprise a fin-like element extending outwardly from the base to a greater extent than it extends transversely across the direction of crop flow, or alternatively the other of the two rotors may be a brush-like structure of the kind set out with regard to other aspects of the invention.

The crop engaging elements on the said other rotor may be arranged in some preferred forms in one or more helical or part helical formations leading around and along the rotor.

Although the crop engaging elements have been referred to as disc-like elements, the outer circumference is not necesarily circular. For example each disc-like element may have an outer perimeter in the general shape of a polygon. Also each disc-like element may be serrated or otherwise shaped to assist engagement of crop by the disc-like element. Furthermore each disc-like element may have a relative shallow depth outstanding from the core, so that the disc-like elements are constituted by annular ring-like elements, and the term disc-like is to be taken to include such elements.

Preferably the rotors are positioned sufficiently closely for the outer perimeters of the rotors to overlap with disc-like elements on one rotor intruding into gaps between crop engaging elements on the other rotor.

Preferably the disc-like elements are positioned perpendicular to the axis of the rotor, and are formed of stiff resilient material, conveniently synthetic plastics sheet material. Such a crop engaging rotor finds application in a number of fields, for example as a pick-up rotor for picking up cut crop from the ground, and as a crop conditioning rotor for effecting conditioning of crop by surface damage to the crop. Such a rotor may be used in isolation or in co-operation with other rotors of the same type, or in co-operation with other conditioning or conveying rotors.

In some arrangements, the spacing between adjacent disc-like elements varies across the width of the rotor, the disc-like elements being closer together at regions of the apparatus at which in operation the volume of crop flow is greatest.

In accordance with yet another independent aspect of the present invention there may be provided a crop engaging device in the iorm of a rotor comprising a plurality of outwardly extending crop engaging elements each comprising a rib-like element of stiff resilient material extending along the direction of the rotor axis and lying substantially in a radial plane, in which each rib-like member is yieldable inwardly towards the rotor axis upon encountering an object likely to damage the element or an excessive crop load, and is urged outwardly by bias means to a normal operating position.

In a particularly preferred form, each rib-like element has at its base a widened portion having sloping sides, the base of the rib-like element being captive in a housing which cooperates with the said sloping sides of the rib-like element to centre the rib-like element to a required outwardly directed operating position while allowing the rib-like element to tilt when moved inwardly against the bias means.

It is particularly to be appreciated that the various crop engaging elements and devices set out in accordance with the various aspects of the present invention, may be usefully incorporated as appropriate in the various overall combinations of crop pick-up and crop conditioning machinery which has been set out hereinbefore and/or which is to be set out by way of example hereinafter. It is to be appreciated that there are also provided in accordance with the present invention various methods of conveying and/or treating crop having the various features set out above with regard to the apparatus according to the invention.

In particular, there may be provided in accordance with one aspect of the invention a method of conveying and/or treating crop, comprising the steps of conveying crop by, or producing crop flow past, a plurality of outwardly extending crop engaging elements each crop engaging element having a principal plane which traverses the general direction of crop flow, and each crop engaging element being formed of stiff resilient material, producing preferential yielding of the crop engaging elements in a selected preferred direction relative to the general direction of crop flow, the said preferred direction of yielding including at least a component along the direction of principal load on the element due to the crop flow, producing yielding of the crop engaging elements at least predominantly by yielding movement at a region spaced from the distal, crop-engaging, regions of the elements, and returning the elements after yielding to their undeflected dispositions at least predominantly by virtue of the resilience of the yielding arrangement.

In accordance with another aspect of the invention there may be provided a method of conveying and/or treating crop, comprising the steps of conveying crop by, or producing crop flow past, a plurality of outwardly extending crop engaging elements, each crop engaging element being a generally flat element formed of stiff resilient material and each element having a principal plane which traverses the general direction of crop flow, and imparting a lateral movement to crop flowing past or conveyed by the elements by presenting each element to the crop with its principal plane inclined to the direction of crop flow.

According to yet a further aspect of the present invention there is provided a method of treating crop comprising the steps of passing crop between two cooperating rotors mounted for counter rotation about parallel axes, at least one rotor comprising a crop treating rotor having a plurality of stiff, resilient, outwardly directed crop engaging elements having sharp tips on the outer ends thereof for treating crop, and the other rotor having a plurality of stiff, resilient, outwardly directed crop engaging elements, rotating the rotors with the outer perimeters of the rotors overlapping and with regular inter-meshing of crop engaging elements on one rotor with crop engaging elements on the other rotor, and utilising the crop engaging elements on the said other rotor to press crop into gaps between the crop engaging elements on the said one rotor which has the sharp tips, so that the crop is laid across the outer ends of the elements on the said one rotor for treating the crop at least predominantly by a spiking action.

Embodiments of the invention will now be described by way of example with reference to the accompanying drawings in which:

FIG. 3 shows a modified form of the crop engaging elements of FIG. 2;

Figure 4A:
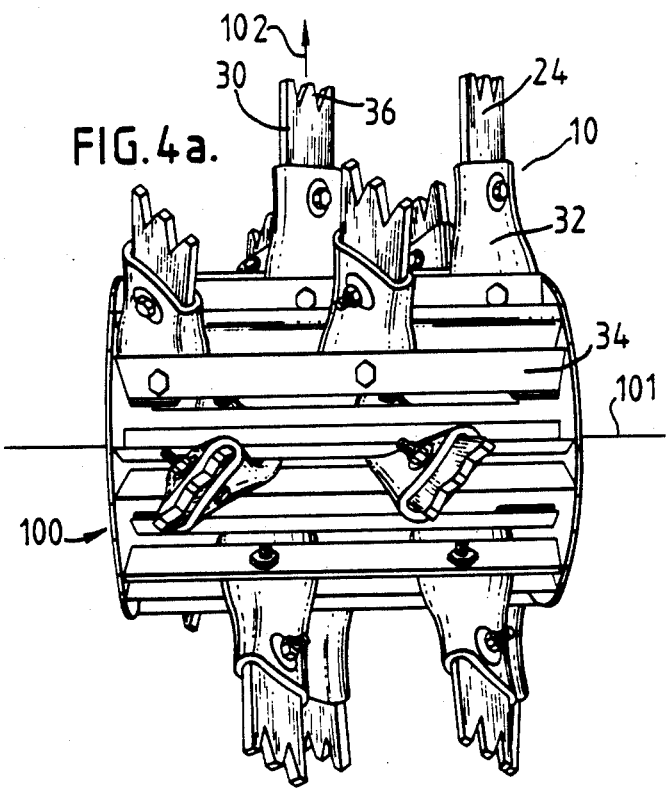
FIG. 4, shows a further modified form of the crop engaging element of FIG. 2.
Figure 4B:
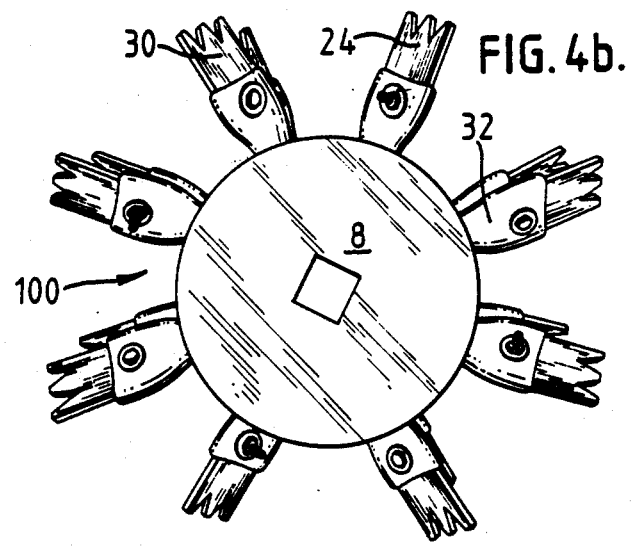
Figure 7A:
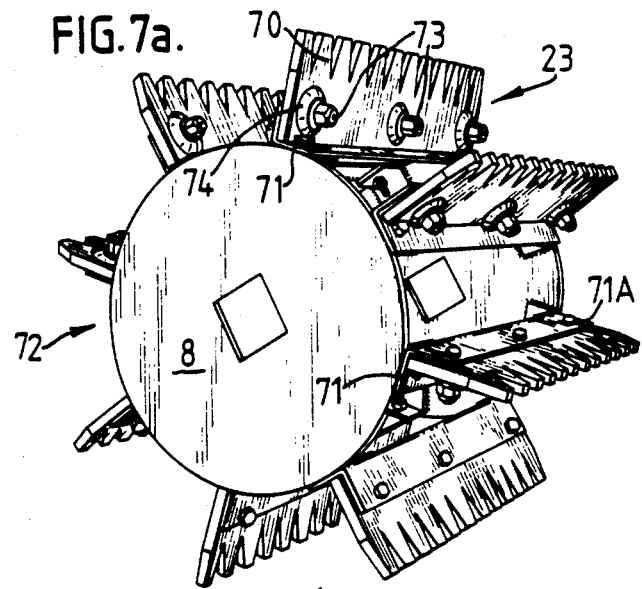
Figure 7B:
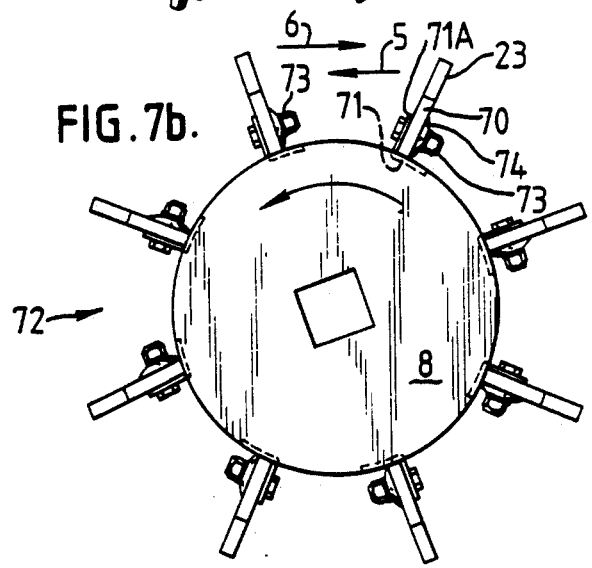
Figure 8:
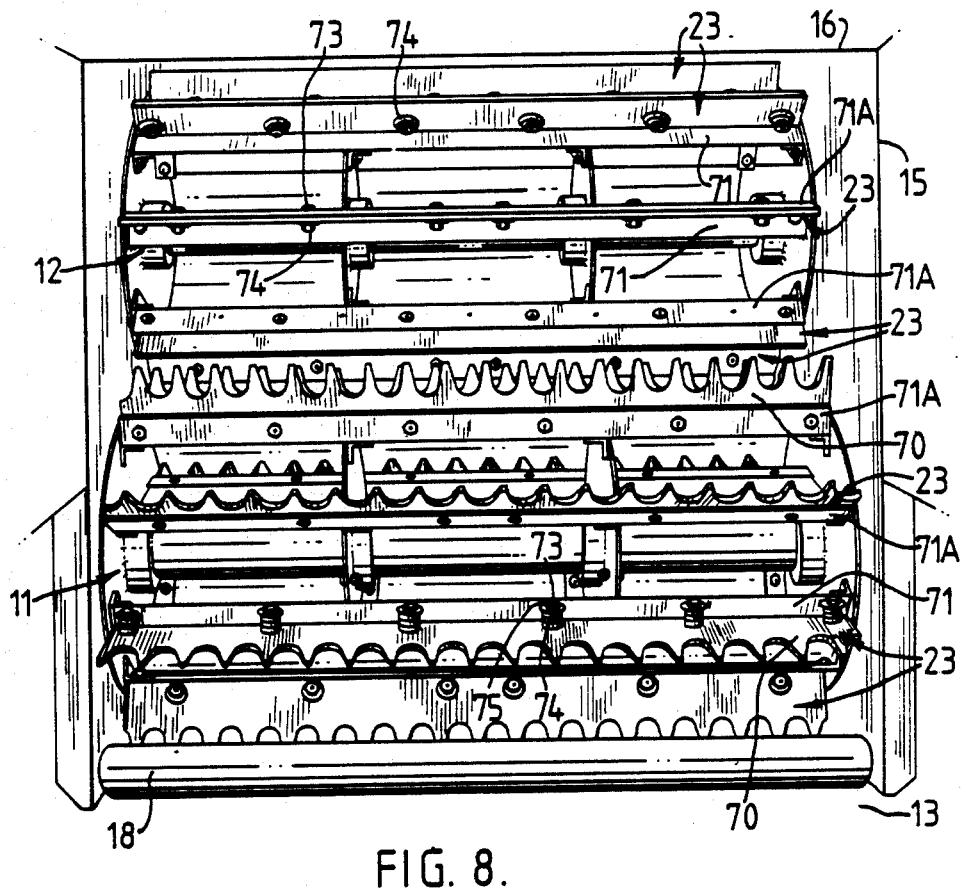
Figure 11:
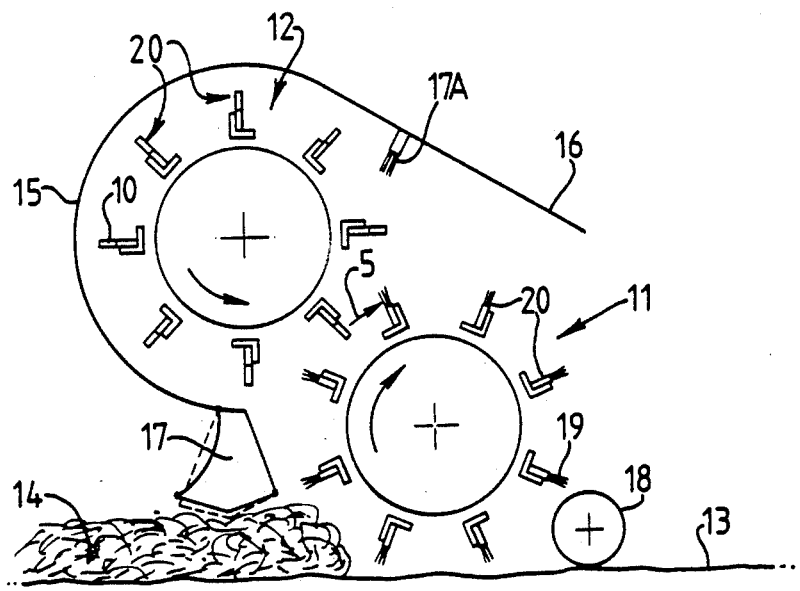
Figure 16:
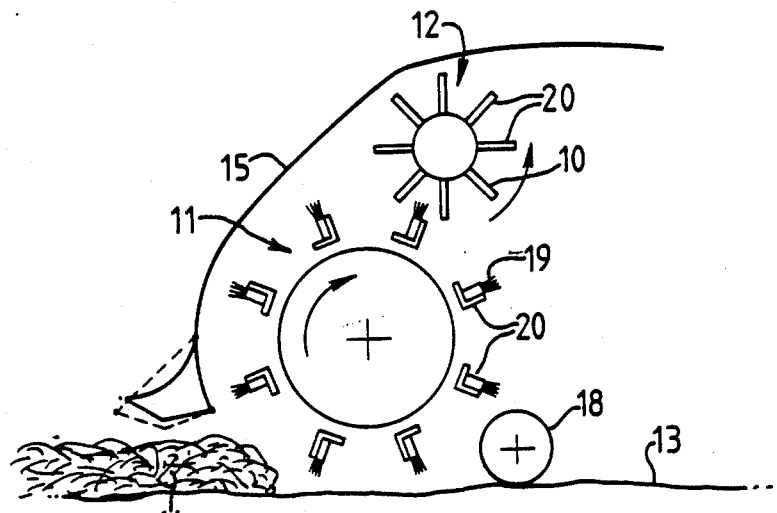
Figure 12:
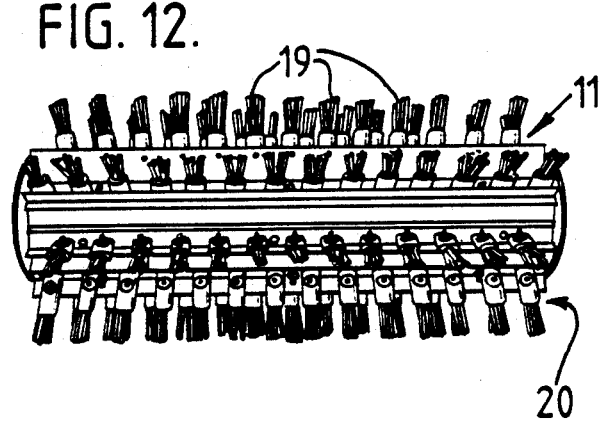
Figure 13:
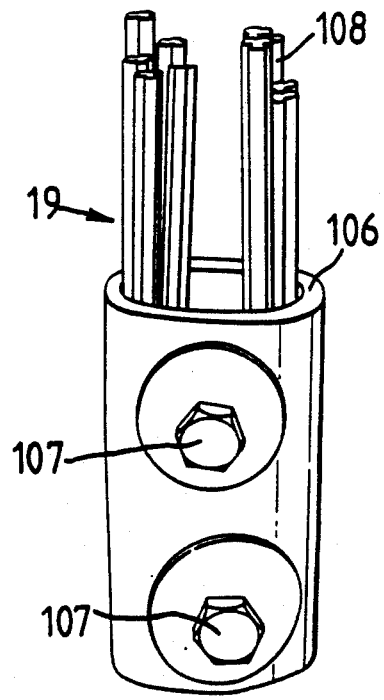
Figure 14:
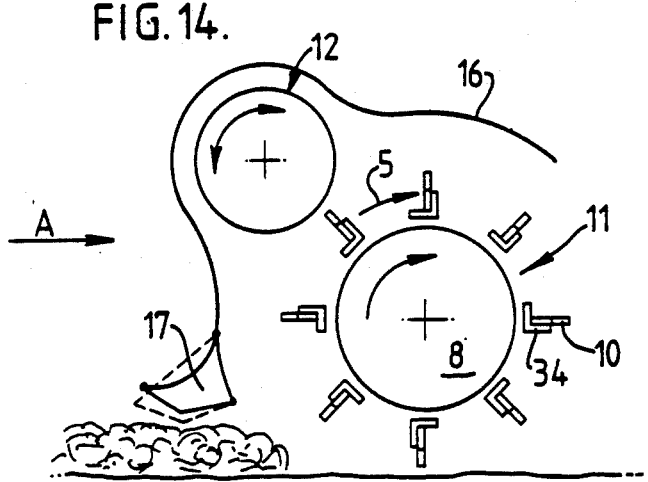
Figure 15:
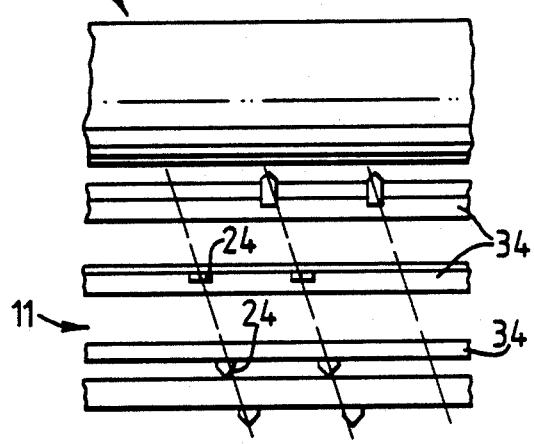
Figure 17C:
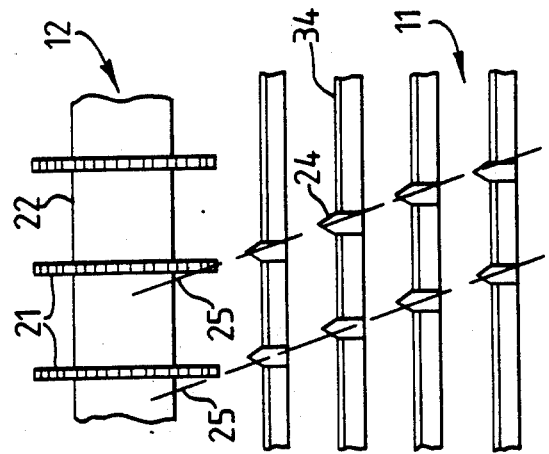
Figure 17A:
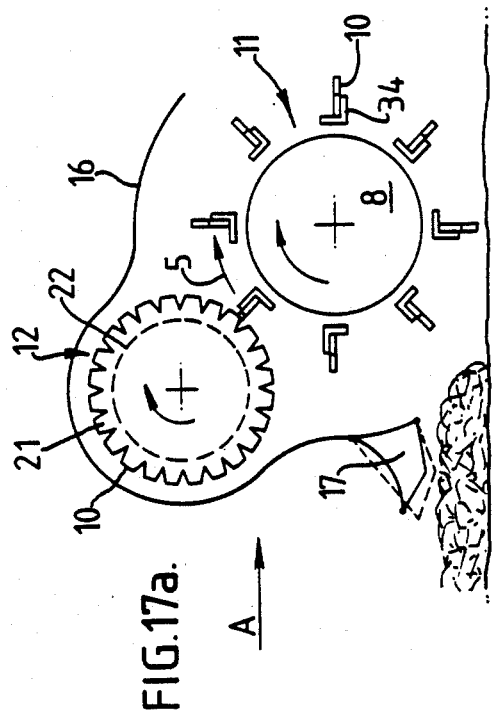
Figure 17B:
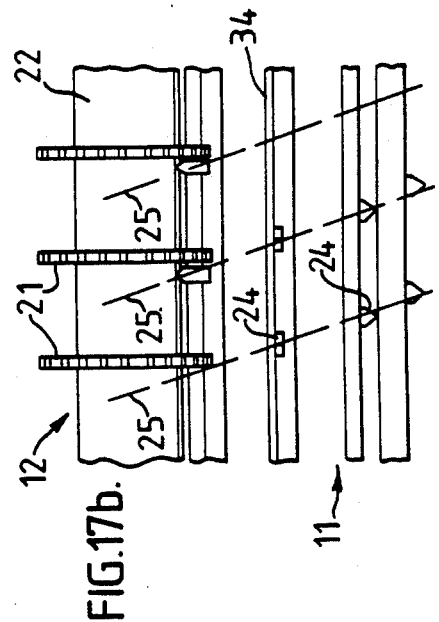
Figure 18:
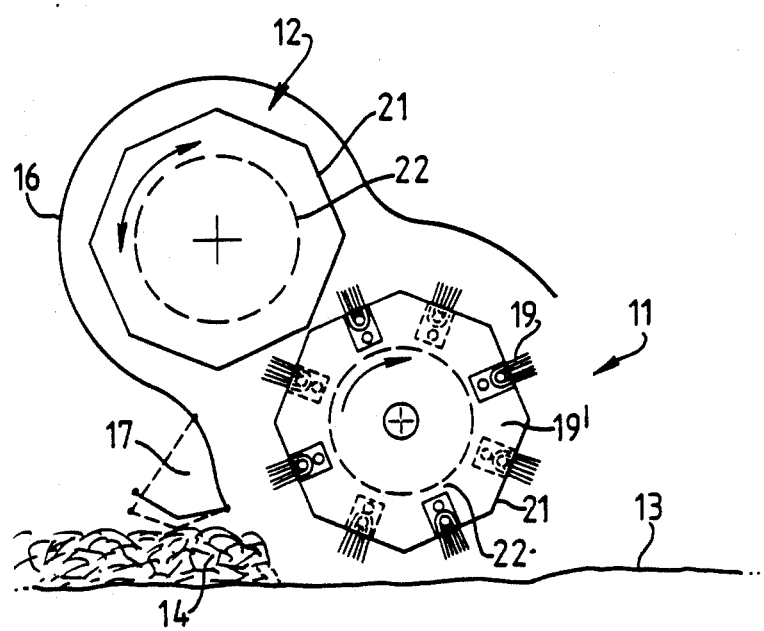
Figure 19B:
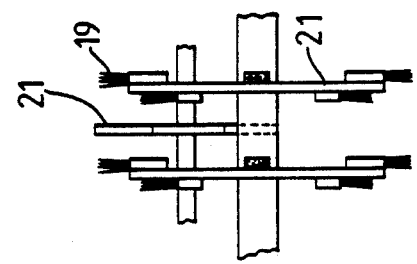
Figure 19A:
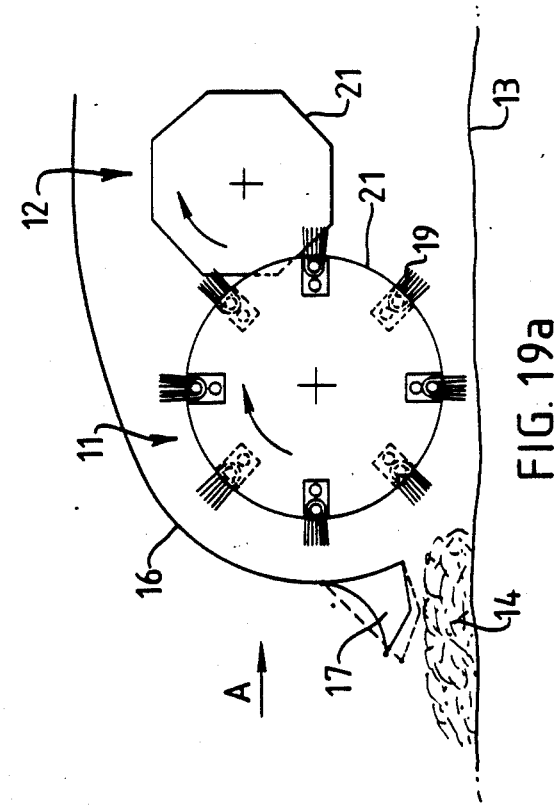
Figure 20B:
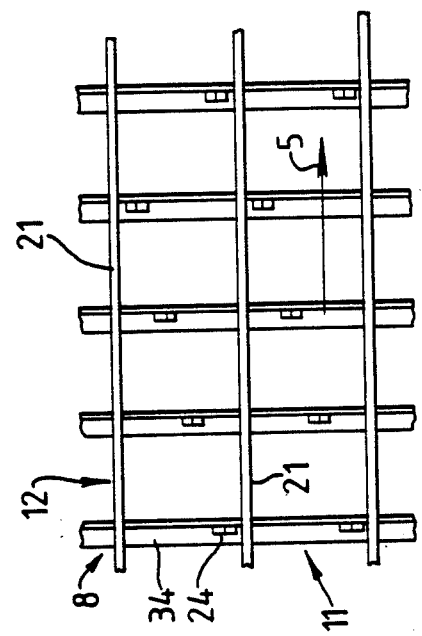
Figure 20A:
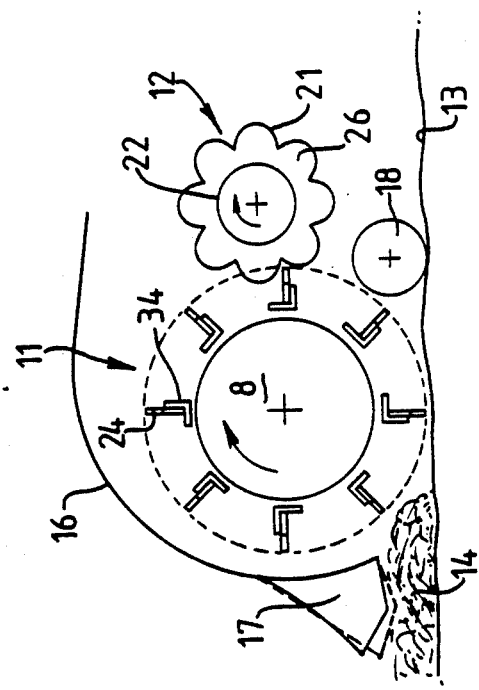
Figure 21:
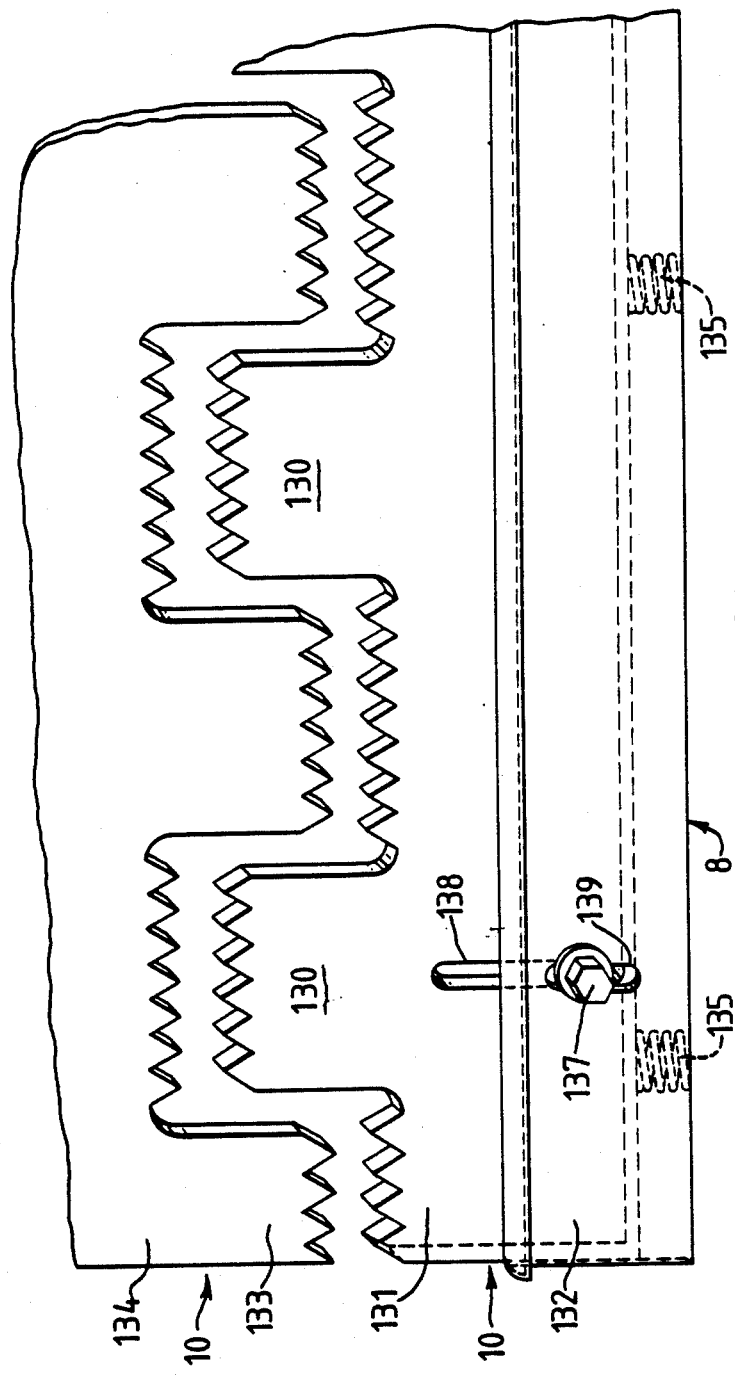
Figures 21A, 21B:
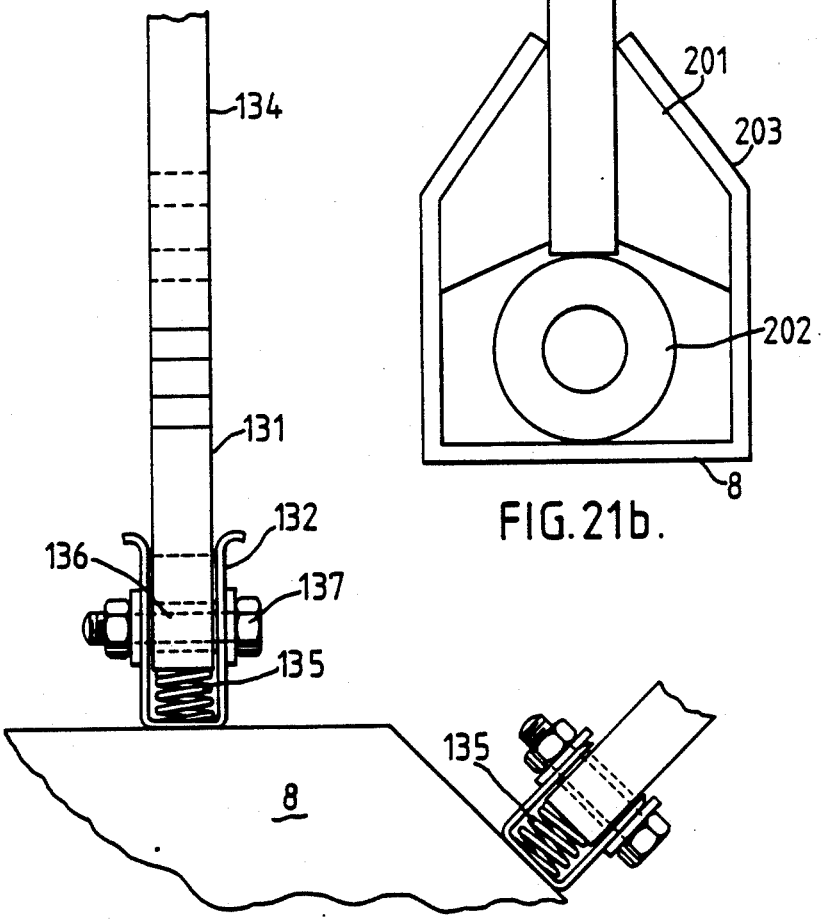
Figure 22:
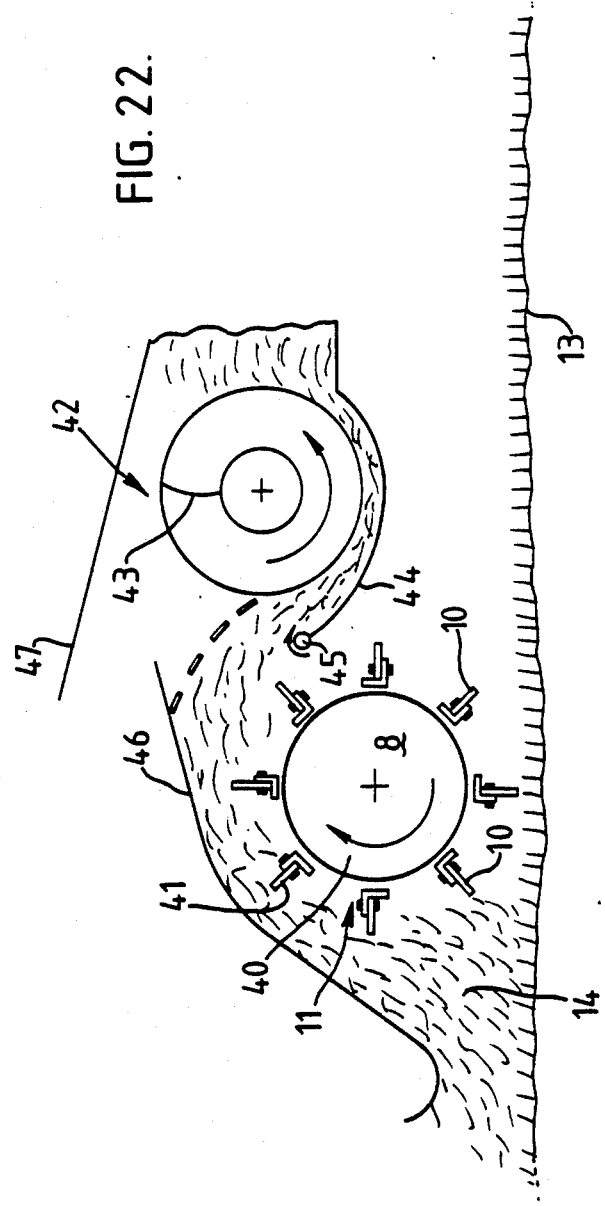
Figure 23:
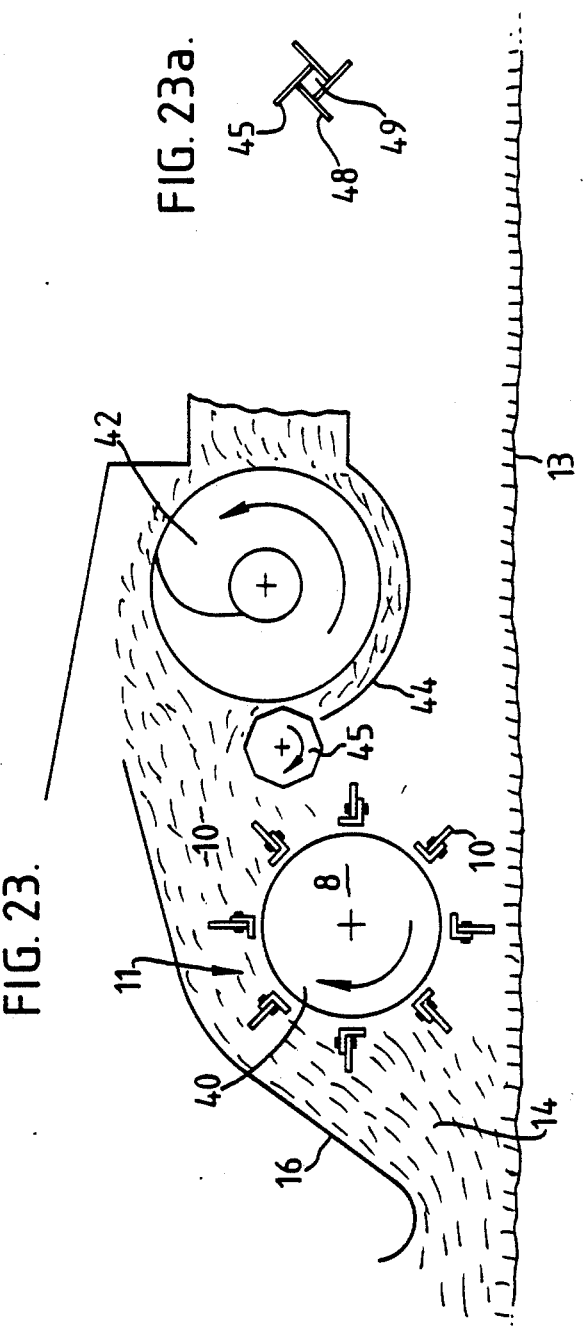
Figure 24:
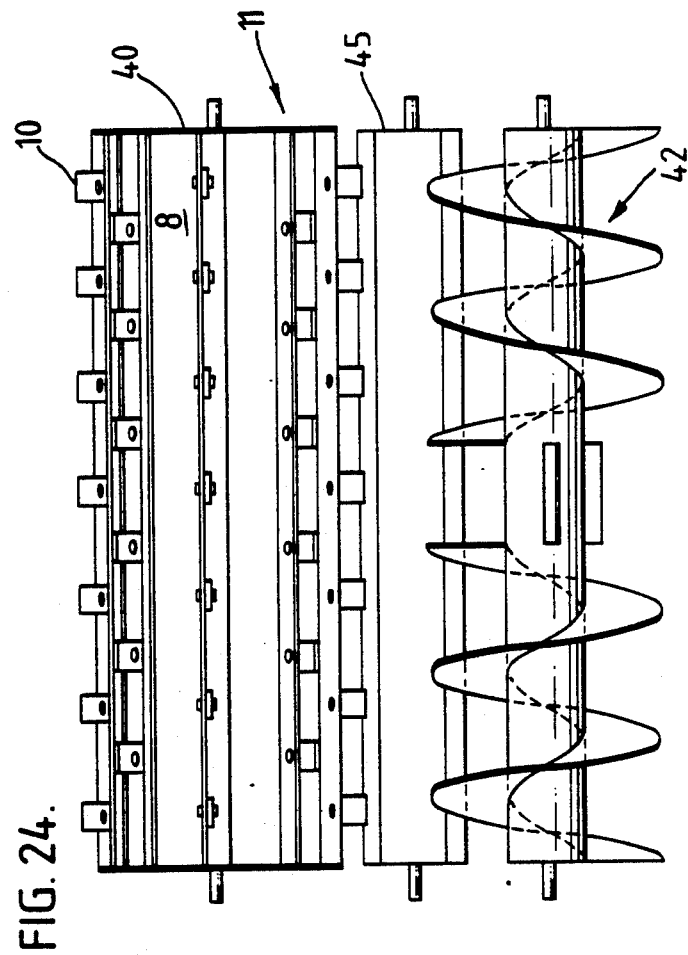
Figure 28:
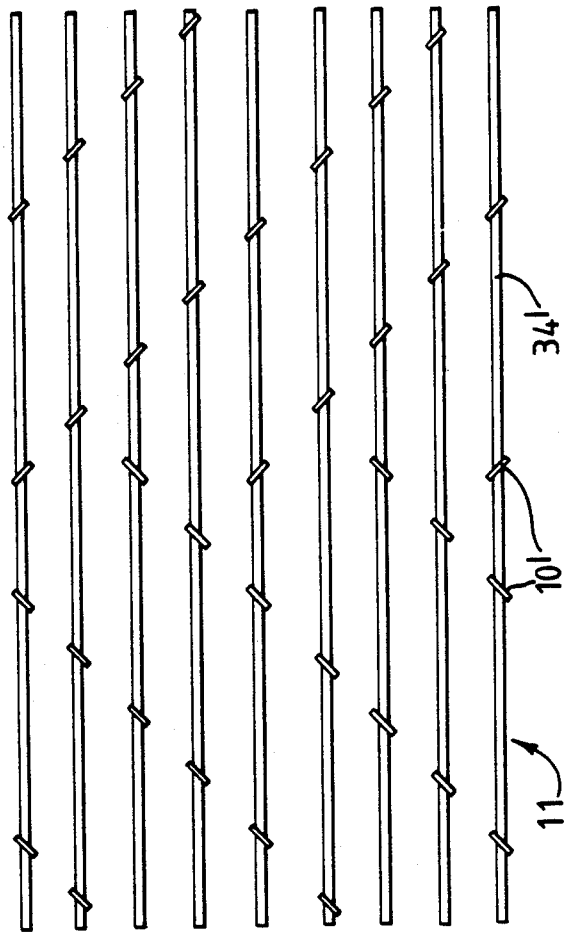
Figure 30A:
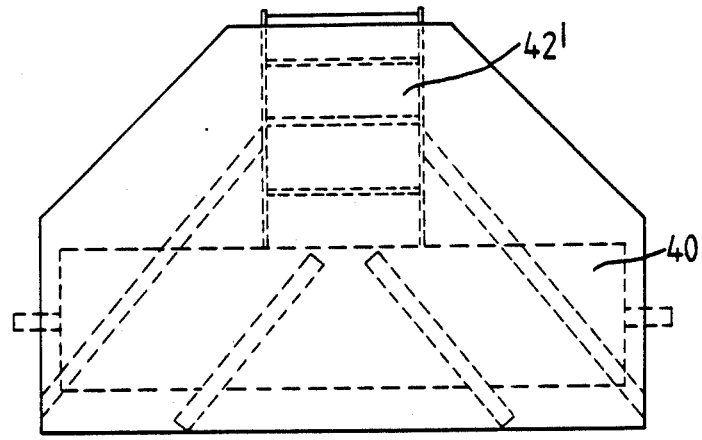

FIGS. 4(a) and 4(b) show diagrammatically plan and side views respectively of a short section of a crop engaging rotor including elements as shown in FIG. 4;

FIGS. 5(a) and 5(b) show side and rear views respectively of a further form of crop engaging element embodying the invention, and FIG. 5(c) shows a further modified form of the crop engaging element of FIGS. 5(a) and 5(b);

FIGS. 6(a) and 6(b) show in side view two forms of crop engaging element embodying the present invention in which the resilience characteristics of the element are selected by variation in thickness of the element;

FIGS. 7(a) and 7(b) show side perspective and side views respectively of part of a crop engaging rotor embodying the invention having outwardly extending rib-like crop engaging elements;

FIG. 8 is a rear view of a crop conditioning apparatus comprising two cooperating crop engaging rotors embodying the invention;

FIG. 9 shows in side view a detail of an alternative mounting for crop engaging elements of FIGS. 7(a) and 7(b);

FIG. 10 shows diagrammatically how two conditioning rotors of the form shown in FIGS. 7(a) and 7(b) may be arranged to interdigitate for conditioning crop;

FIG. 11 shows in diagrammatic side view apparatus for picking up cut from the ground, and for conditioning the crop, embodying the invention;

FIG. 12 shows a view from above of one form of conditioning rotor which may be used in the embodiment of FIG. 11;

FIG. 13, shows a perspective view of a tuft of conditioning elements suitable for use in the conditioning rotor of FIG. 12;

FIGS. 14 and 15 show side and end views of a crop pick-up and conditioning apparatus consisting of a modified form of the apparatus of FIG. 11;

FIG. 16 shows in diagrammatic side view a crop pick-up and conditioning apparatus consisting of a modified form of the apparatus of FIG. 11;

FIG. 17(a) is a diagrammatic side view of an alternative form of the crop pick-up and conditioning apparatus of FIG. 11., FIG. 17(b) is a diagrammatic view of part of the rotors of the a paratus of FIG. 17(a), taken in the direction A in FIG. 17(a), with the cover of the machine omitted;

FIG. 17(c) is a diagrammatic view of part of the upper rotor of FIG. 17(a) and of a development of part of the envelope of the lower rotor of FIG. 17(a);

FIG. 18 is a diagrammatic side view of a modified form of the crop pick-up and conditioning apparatus of FIG. 17(a);

FIG. 19(a) is a diagrammatic side view of a further modification of the crop pick-up and conditioning apparatus of FIG. 17;

FIG. 19(b) shows part of the rotors of FIG. 19(a) when viewed from the front along the direction of the arrow A in FIG. 19(a);

FIG. 20(a) shows a diagrammatic side view of a iurther modification of the crop pick-up and conditioning apparatus of FIG. 17(a);

FIG. 20(b) is a diagrammatic representation of a development of the rotors of FIG. 20(a), showing an example of the inter-relationship of crop engaging elements on the two rotors;

FIG. 21 shows in diagrammatic perspective view the inter-meshing relationship of crop engaging elements on two co-operating rotors in a further modified form of the crop handling apparatus shown in FIG. 11;

FIG. 21(a) is a diagrammatic side view showing the attachment of crop engaging elements to a main structure of the lower rotor shown in FIG. 21;

FIG. 21(b) is a diagrammatic side view of a modified form of the crop engaging element shown in FIGS. 21 and 21(a);

FIG. 22 is a diagrammatic side view of a crop pick-up apparatus embodying the invention, and illustrating a use of the crop engaging rotor shown in preceding figures;

FIG. 23 is a diagrammatic side view of a modified form of the crop pick-up apparatus shown in FIG. 22, and FIG. 23a shows an alternative form of intermediate or cop transfer rotor which may be used in the embodiment of FIG. 23, FIG. 24 is a diagrammatic plan view of the crop pick-up apparatus shown in FIG. 23, FIG. 25 is a diagrammatic perspective view from the front of a further form of crop pick-up apparatus, shown for use with means for spraying a chemical additive on to the crop;

FIG. 26 is a diagrammatic side view of a yet further modified form of pick-up apparatus, including a longitudinal auger positioned behind the pick-up rotor;

FIG. 27 is a side view in diagrammatic form of a further modified pick-up rotor embodying the invention, and incorporating lateral crop collecting augers and a centrally placed feed auger behind the pick-up rotor;

FIG. 28 shows a development, in a diagrammatic form, of a mounting arrangement of crop engaging elements on a rotor;

FIGS. 29(a) to 29(d) show diagrammatic representations of different modes of interation of twin rotor conditioning units; and FIGS. 30(a) and show diagrammatic plan and side views of an arrangement of a crop gathering pick-up rotor.

Figure 1A:
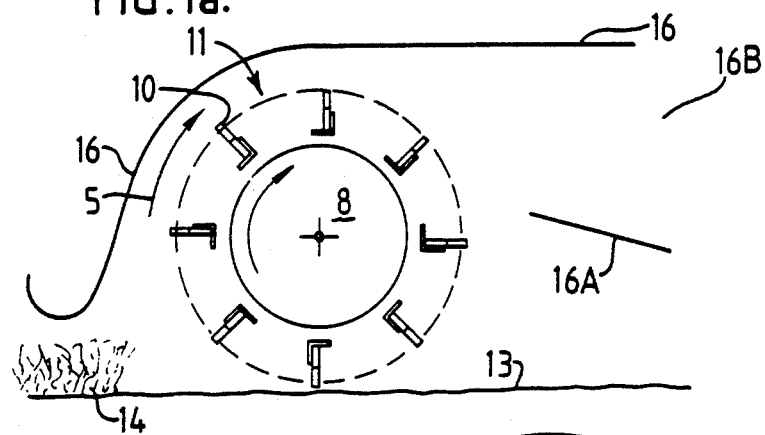
FIG. 1(a) shows in diagrammatic side view apparatus for picking up cut crop from the ground, which may incorporate aspects of the invention.
Figure 1B:
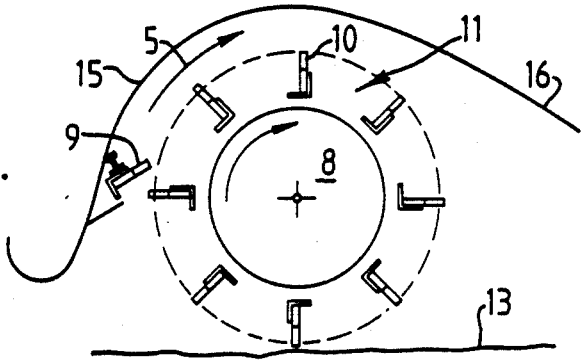
FIG. 1(b) shows in diagrammatic side view apparatus for conditioning crop by a single pick-up and conditioning rotor, which may incorporate aspects of the invention.

FIGS. 1, 1(a), and 1(b) show diagrammatically three basic layouts of crop engaging apparatus which may embody various aspects of the present invention.

In FIG. 1(a) there is shown a crop pick-up apparatus comprising a rotor 11 mounted on a mobile main frame (not shown) for movement over the ground 13 to pick-up previously cut crop shown at 14. A hood 15 extends around the rotor 11 and rearwardly at 16 above a guide plate 16A to form a crop channel 16B leading to a receptacle or to further crop processing machinery such as the chopping mechanism of a forage harvester. The rotor 11 picks up cut crop and passes the crop upwardly over the rotor and rearwardly between the hood extension and the guide plate 16A along the crop channel 16B.

The rotor 11 has a plurality of stiff resilient outwardly directed crop engaging elements indicated generally at 10, which may incorporate any of the features to be described in accordance with the invention hereinafter, or which have been described hereinbefore. The elements 10 are mounted on support means, referred to generally as a support 8, which may for example comprise a number of transverse angle section bars mounted on spaced apart discs to form a squirrel-cage type of rotor base. However other forms of rotor support means may be used as will be described hereinafter.

FIG. 1(b) shows diagrammatically a crop pick-up and conditioning apparatus which has generally the same construction as the apparatus of FIG. 1(a) except that the elements 10 are arranged to perform a crop conditioning function in addition to a crop pick-up function, and there is provided an optional additional stationary crop engaging device 9 under the hood 15 for co-operating with the rotor 11 to effect conditioning. The crop engaging device 9 may be of the same general form as the crop engaging elements 10 on the rotor, or may be any one of a number of other forms to be described hereinafter. The conditioned crop is returned to the ground at the rear and is guided downwardly by the hood extension 16, which in this arrangement is inclined downwardly.

Figure 1C:
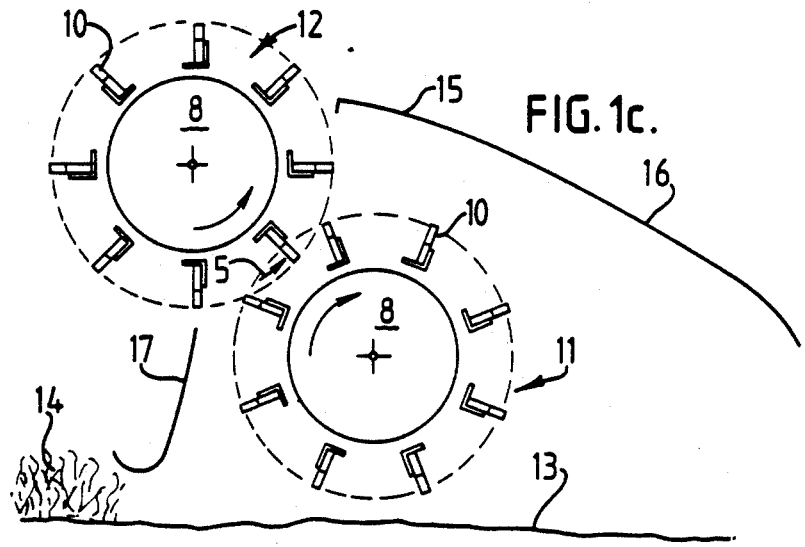
FIG. 1(c) shows in diagrammatic side view apparatus for conditioning crop by co-operation of two conditioning rotors, which may incorporate aspects of the present invention.

In FIG. 1(c) there is shown a crop pick-up and conditioning apparatus having a number of components in common with the arrangement of FIG. 1(a), but including a second rotor 12 which is mounted to rotate in co-operation with the first rotor 11. In the example shown the second rotor 12 rotates in counter-rotation to the rotor 11 to effect crop conditioning in the overlap region between the two rotors, in addition to the conditioning which takes place due to slip during acceleration of the crop 14 on first contact with rotor 11. In other examples to be described hereinafter, the rotors may rotate in the same sense, or in the opposite sense with different speeds of rotation.

The elements of one or each rotor may comprise elements in accordance with aspects of the present invention, or one of the rotors may comprise a brush conditioning rotor of the kind described in our co-pending UK Patent Application No. 8012426, Publication No. 2041713A.

It is to be appreciated that many variations of the arrangements shown in FIGS. 1(a), 1(b) and 1(c) are available, for example there may be provided additional crop slowing, or accelerating, devices, and the co-operating rotors of FIG. 1(c) may be of different sizes and may be rotated clear of each other at different speeds, and in the same or different senses. Many such variations will be described hereinafter; FIGS. 1(a), 1(b) and 1(c) are provided as a general introduction to the types of configuration which may be used.

Next there will be described a series of forms of crop engaging elements suitable for use in the apparatus shown in FIGS. 1(a), 1(b) and 1(c), and in other arrangements. Preferably the elements to be described are formed of stiff flat resilient synthetic plastics material (for example sheeting material), and have two main forms, namely a relatively narrow outwardly directed fin-like element, or a relatively wide transverse rib-like element. In general, in the following description crop engaging elements are indicated by the general reference numeral 10 where the element can comprise a fin-like element or a rib-like element, or indeed other forms of crop engaging element. Where the element is particularly a fin-like element, a general reference numeral 24 is used, and where the element is particularly a rib-like element a general reference numeral 23 is used. In other embodiments to be described hereinafter, disc-like crop engaging elements are indicated generally by the reference numeral 21, and brush filaments forming tufts of brushes and constituting crop engaging elements are indicated generally by reference numeral 19. These latter elements do not embody the present invention in themselves, but may form part of embodiments of the invention in some aspects. The crop engaging elements may be arranged for crop conditioning or other crop treatment such as threshing, crop pick-up or crop conveying, or any combination of these functions.

Figure 2:
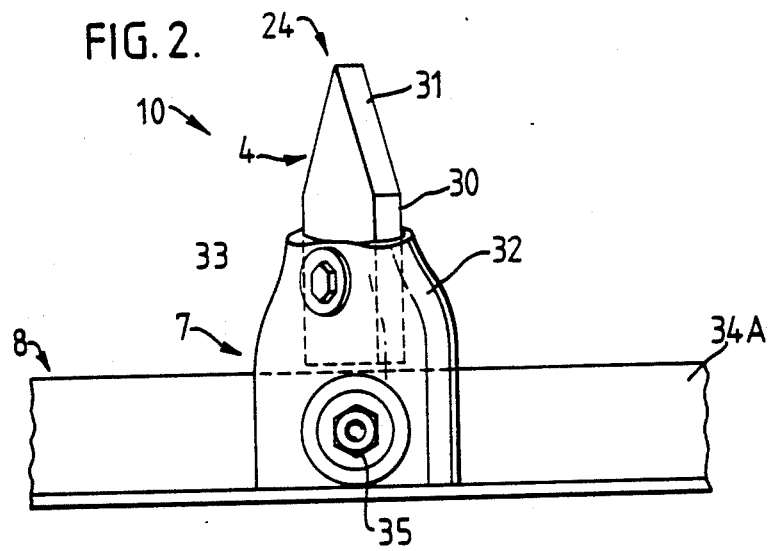
FIG. 2 is a diagrammatic perspective view from the rear of a single crop engaging element secured to a main support member of a crop engaging rotor, and which forms an embodiment of the invention in one aspect.
Figure 2A:
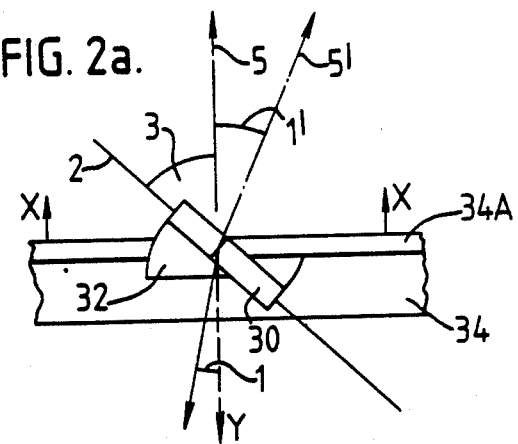
FIG. 2(a) is a diagrammatic plan view of the element shown in FIG. 2.

In FIGS. 2 and 2(a) a crop engaging element 24 comprises a planar fin 30 cut from synthetic plastics material and having an outer pof nted end 31. The fin 30 is secured in a flexible tubular sleeve 32 by a bolt 33, and the sleeve 32 is in turn secured to a transverse angle bar 34 by a bolt 35. The bar 34 forms part of a squirrel cage rotor composed of a series of axially extending bars 34 which form a support 8 for the element 24.

In operation the rotor formed by the bars 34 will normally be rotated in a sense such that the bar 34 in FIG. 2 moves downwardly into the page. In such a case an upstanding flange 34A of the bar 84 leads the sleeve 32 and protects the securement point of the sleeve. The movement of the bar 34 is indicated diagrammatically at arrows X in FIG. 2(a). If the bars 34 form part of a conveying rotor, such as the rotor 11 in FIG. 1(a), the general, overall, direction of crop flow will be the same as the direction of movement of the bar 34, and the general direction of crop flow in such a case is shown at 5 in FIG. 2(a). It is to be noted particularly that the crop may aso have superimposed on this general direction of movement a lateral movement by interaction with the angled fin 30, and indeed such additional lateral movement is a particular feature of the invention in many aspects. A direction of crop reaction to contact with the angled fin 30 is indicated generally at 5' in FIG. 2(a), the angle 1' between the general direction of crop ilow and the direction of crop reaction 5' being dependent on the shape and width of the element, in addition to dependence on crop factors and rotor speed. Where the term general direction of crop flow is used, what is meant it the overall main direction of movement of crop. This overall main movement of the crop may either be effected by the crop engaging elements (acting as crop conveying elements) or may be effected by other means and may be a crop movement past the crop engaging means (for example where the crop engaging elements are stationary).

The case to be described with reference to FIG. 2(a) is the simple case where the element 10 is a crop conveying element which is moving the crop by driven movement of the element. Both the element 10 and the crop are moving in the same overall direction, with the element 10 moving faster than the crop, so that the principal load on the element 10 is in the direction indicated at Y, i.e. the opposite direction to the crop flow direction 5.

It is particularly to be appreciated that the various angles and directions indicated in FIG. 2(a) are not intended to indicate precise directions but are given to assist understanding of the invention. In practical circumstances the invention is concerned with overall effects on the crop, and general directions in which the elements yield, and convey the crop.

The fin form element 24 may be arranged with the fin 30 parallel to the angle bar 34, that is to say generally perpendicular to the directions of crop flow, and generally parallel to the axis of rotation of the rotor, but it is preferred that the fin 30 is inclined at a skew angle to the axis of the rotor, as shown. Thus in FIG. 2(a), the principal plane of the crop engaging element 24 is indicated diagrammatically at 2, and is inclined at an angle 3 to the general direction 5 of crop flow. The angle 3 is conveniently 45°.

The effect of the sleeve 32 is to provide for yielding of the tip 31 in a preferred direction relative to the direction of crop flow 5. By a preferred direction of yielding is meant that the fin yields more easily in one direction than another. In the case shown in FIG. 2 and 2(a), the effect of the flattening of the sleeve at the bolts 33 and 35 is that the fin 31 yields most easily in a direction intermediate between the direction 5 of crop flow, and a direction perpendicular to the principal plane 2. The preferred direction of yielding is indicated diagrammatically at 6, and is inclined at an angle 1 to the direction Y of principal load on the element 30 due to crop flow. The angle 1 may be in the range 20° to 25° for the arrangement shown. The region of yielding of the element 24 is indicated at 7 and is formed by the portion of the sleeve 32 between the bolts 33 and 35. The region of yielding is spaced from the crop engaging region 4 of the element 24 and is closer to the support 8 than to the outer tip 31 of the element.

FIG. 3 shows a modification of the crop engaging element 24 of FIG. 2 in which the outer end of the fin 30 is formed with a series of stepped serrations 36. Attention is drawn to the stepped and raked-back leading edge of the fin 30 of the crop engaging element 24. An advangtage of this design is that the abrasiveness of the tip regions is increased, and the tendency for crop to "hairpin" is greatly reduced. As a result of the latter, crop leaves a conditioning rotor cleanly, and none is driven hard into the stubble where it can obstruct the inflow of air beneath the swath. It is to be appreciated that this feature of the stepped and raked-back leading edges of the crop engaging element provide an independent inventive aspect of the present invention.

FIG. 4 shows another version of a resiliently mounted conditioning element 24 of fin form, but with the outer tip surface substantially parallel to the ground to give maximum crop lifting effect. The outer tip surface is optionally serrated, and the principal plane of the fin is again inclined at an angle to the axis of the rotor.

The elements of FIGS. 2, 3 and 4 conveniently can be mounted so that elements on successive mounting bars are offset irom each other so as to be arranged in a helical formation. A split helix can be devised either to move the crop towards the centre region or towards the outer regions of the rotor (FIG. 28). The effect is achieved by all the crop engaging elements on the pick-up rotor in one half relative to its fore and aft centre line being angled in the same direction, and those in the other half being angled in the opposite direction. If the development of such a rotor shows the apex of the chevron formation of elements leading, the crop stream will be teased out laterally. If the apex is trailing, the crop stream will be concentrated towards the centre. On pick-up rotors it is useful to achieve even distribution of crop laterally from windrows, which are usually heap-shaped in cross-section, so that machines such as in-line balers are fed more uniformly with material, to form well-packed bales. Gathering spread crop or concentrating a windrow into a more solid crop stream can lead to design simplification, for example obviating the need for header augers in forage harvesters or other feed simplifications (FIG. 30(a) and 30(b)).

The crop engaging elements shown in FIGS. 2, 3 and 4 are specifically useful for pick-up and conveying rotors where no specific conditioning eifect is required, as well as for use in conditioning rotors where damage to the crop is required. The crop gathering and release characteristics of these elements are such that pick-up rotors in particular can run at relatively low speed and, hence, use less power than brush type rotors.

FIGS. 4(a) and 4(b) are top and side views respectively of part of a crop engaging rotor 100 on which crop engaging elements as shown in FIG. 4 are mounted in alternate rows so that the fins are inclined in opposite directions to the transverse rotor axis 101. Each element 24 extends outwardly along a direction indicated at 102, which may be perpendicular to the rotor axis 101. The various angles of inclination discussed above are to be found correspondingly in the arrangement of FIGS. 4(a) and 4(b). It is to be appreciated that the width of the rotor shown is much less than that required for normal use. Suitably the rotor may be for example 2 m wide with crop engaging elements across the width at, for example, intervals of 15 cm.

FIGS. 5(a) and 5(b) show a crop engaging element 24 made of a strip of synthetic plastics sheeting material twisted at a region 7 so that one end lies at right angles to the other. Attachment to a mounting bar 34 on rotor support 8 may be such that when the crop engaging element engages crop it either presents a narrow or wide face to the crop. The element of FIG. 5(a) is shown in FIG. 5(b) in rear view. FIG. 5(c) shows a similar element which is twisted less so that its extreme ends lie at 45° to each other.

A specific advantage of the angled and twisted elements described in FIGS. 2 to 5 is that under excessive tip loads the elements tend to be deflected rearwardly and at an angle laterally.

In FIGS. 6(a) and 6(b) there are shown in diagrammatic side view two alternative forms of crop engaging element 10 which may be used. In both FIGS. 6(a) and 6(b), the element may be in the form of an outwardly directed fin 24, or may be in the form of an elongate transverse rib 23 (or indeed in a form between the two). Thus the cross-section shown is useful in both main forms of the crop engaging element described herein. Where the cross-section is thicker at the base region as in FIG. 6(a), the tip 4 will bend away smoothly and easily under the influence of a load. This is of particular advantage in a pick-up rotor so that unwanted foreign objects on the field surface are readily passed over instead of being lifted with the crop. When the tip 4 is thicker as in FIG. 6(b), its momentum and transverse rigidity will tend to be maintained under the influence of a load and it will tend to remain straight, any bending taking place mainly at the thinner base region 7. This is of advantage where heavy windrows need to be teased out effectively, yet an adequate response is necessary to heavy entrained objects. The conditioning elements of tapering cross-section in FIGS. 6(a) and 6(b) are fixedly secured to angle bars 34 by bolts 34A, the yielding of the elements 10 being provided by virtue of the resilience of the material of the element.

In FIGS. 7(a) and 7(b) there are shown side perspective and side views respectively of a crop engaging rotor indicated generally at 72, and having outwardly directed crop engaging elements 29 each comprising a transverse serrated rib 70 bolted by bolts 73 to an angle bar 71. Each bolt 73 passes through a domed resilient washer 74 formed of synthetic platic material, which allows yielding of the rib 70 by a rocking motion against the angle bar 71, the washers 74 being deformed by the rocking motion. In this embodiment, the element 23 is yieldable preferentially in a preferred direction 6 which is aligned generally along the direction of crop flow, indicated at 5.

In the case of the embodiment shown in FIGS. 7(a) and 7(b) the principal plane 2 of each crop engaging element 70 is generally perpendicular to the general direction of crop flow 6, when the element 70 engages the crop at the top centre position indicated at 2A.

In FIG. 8 there is shown a rear view of a crop conditioning apparatus, comprising two cooperating rotors 11 and 12, arranged generally as shown in FIG. 1(c) or as shown in FIG. 29(b) or FIG. 29(c). Referring to FIG. 8, each rotor has transverse rib-like elements 23 mounted on a supporting core 8, and the elements 23 may be generally mounted as shown in FIGS. 7(a) and 7(b) or as in FIG. 9. The two rotors 11 and 12 are rotated in counter rotation with the elements 23 of one rotor interleaving with the elements 23 of the other rotor, to achieve conditioning of crop generally as will be explained hereinafter with reference to FIG. 11. Thus the lower rotor 11 is arranged to rotate in the manner known as the overshot mode, with the elements 23 moving at their lowest positions in the opposite direction to the direction of movement of the apparatus over the ground, so that crop is picked up from the ground, or from a cutter, and is carried upwardly and rearwardly over the rotor 11. It is a feature of the arrangement shown in FIG. 8 that the rib-like elements 23 of the upper rotor 12 are plain transverse ribs e.g. formed of sheets of synthetic plastics material, and the rib-like elements 23 of the lower rotor 11 are similar but are shaped with deep serrations so as to form outwardly directed spikes.

In FIG. 9 there is shown in side view details of and attachment for the rib 70. The rib 70 may be fixedly secured or additional resilience is achieved if the hole through the rib 70 for the bolt 73 is slightly larger than the diameter of the bolt and a coil spring washer 74 is inserted between the trailing face of the rib 70 and a self-locking nut 75, as shown in FIG. 9. The extent of tightening of the nut 75 determines the resistance of the rib to deflection. FIG. 10 shows diagrammatically how two rotors as shown in FIG. 7, or one rotor and a stationary serrated crop retarding plate as shown in FIG. 1(b), can be made to inter-mesh to achieve conditioning of crop.

There will now be described a series of applications of the conditioning elements shown in the preceding figures, and of other crop conveying and conditioning arrangements embodying the invention.

Referring firstly to FIG. 11 there is shown a crop pick-up and conditioning apparatus comprising a first rotor 11 and second rotor 12, both mounted on a mobile main frame (not shown) for movement over the ground 13 to pick-up and condition previously cut crop shown at 14. A hood 15 extends around the second rotor 12, and rearwardly at 16 over the first rotor 11. A forwardly projecting portion 17 of the hood 15 is adjustable or self-adjusting at the lower end as shown so as to be positioned in close proximity to the cut crop 14. An optional, height adjustable ground roller 18 is positioned immediately behind the first rotor 11.

The first and second rotors 11 and 12 are mounted for counter rotation about parallel horizontal axes ior passage of crop between the two rotors. The first rotor 11 is a crop conditioning rotor comprising a brush-like structure having a multiplicity of stiff resilient outwardly directed conditioning elements indicated generally at 19 for conditioning crop by relative movement between the conditioning elements and the crop and by a spiking action in the overlap zone between the two rotors. The conditioning elements 19 are arranged in a series of elongate formations 20 comprising spaced apart rows, the rows being transverse rows generally along the direction of the axis of the rotor. Conveniently the first rotor 11 may consist of a conditioning device of the type specified hereinbefore, conveniently a brush conditioning rotor of the kind described in our published pending UK Patent Application No. 8012426, and shown by way of explanation in FIGS. 12 to 15. In FIGS. 12 and 13 the conditioning elements 19 are in the form of tufts of brush elements 108, the tufts being spaced apart along the rows. The tufts are conveniently formed of doubled-over lengths of synthetic plastics rod material secured by bolts 107 in flexible supporting sleeves 106. In comparison with the brush conditioning rotors described in our previous pending application, it is preferred that there is a greater density of brush tufts across the width of the rotor, ideally the elongate formations 20 comprising virtually continuous rows of plastic rods or spikes, with distinct gaps between the tuft rows around the circumference.

Referring again to FIG. 11, the second rotor 12 comprises a feeding rotor having a plurality of outwardly directed crop engaging elements also arranged in a formation of spaced apart, transverse, elongate formations 20 generally extending in the direction of the axis of the rotor. Each elongate formation of the feeding rotor 12 is indicated at 20 and may be formed for example by a single rib-like element of stiff material which either has a degree of resilience itself or is fitted to mounting means so that the outer edge can deflect circumferentially under atypical loads imposed by crop or foreign objects. Each elongate formation 20 on the feeding rotor 12 may either be formed by a single crop engaging element consisting of a single rib formed of a flat stiff resilient synthetic plastics material (for example a sheet of material) extending across the length of the rotor, or may be formed by a row of outwardly directed fins, also conveniently of stiff resilient synthetic plastics material. In the following description it will be assumed that the elongate formations 20 on the feed. rotor 12 comprise transverse rib like elements 23, and the elongate formations 20 on the conditioning rotor comprise rows of brush-like elements 19.

The two rotors 11 and 12 are driven in synchronism by drive means (not shown) conveniently driven from the pto of a tractor, and are arranged to rotate with the outer perimeters of the rotors overlapping and with regular inter-meshing of the rows of each rotor with the rows of the other. Thus the rib or sheet crop engaging elements 23 overlap the envelope of the brush tufts 19 and are synchronised with the rows 20 of brush tufts so as to intrude into the gaps between the rows 20 of brush tufts in such a manner that the crop engaging elements 23 press the crop into the gaps between the rows 20 of brush tufts 19 so that the crop is laid across the abrading and spiking tips of the conditioning elements 19 to produce particularly effective conditioning of the crop. Both rotors are driven at identical speed, and the synchronisation can be varied so that the elongate formations 20 on the feeding rotor intrude into the crop stream immediately behind, centrally, or in front of, the corresponding rows 20 of brush tufts 19 on the conditioning rotor 11.

The effect derived consists of stuffing or packing by the rib-like elements 23 of the feeding rotor 12 which press the crop downwardly into and onto the conditioning elements 19 of the conditioning rotor 11, thus causing a more thorough conditioning treatment. In some circumstances such a packing action requires an increase in speed of both rotors above the normal threshold speed of the brush rotor to ensure stripping of crop, compared with conditioning without the packing action. In the arrangement of FIG. 11, the packing action is a peripheral packing action in which the plastics elements 23 on the feeding rotor urge the crop against the brush conditioning elements 19 by pressing the crop into the gaps between the rows so that it is laid across the ends of the brush tufts generally in the direction of crop flow. The rotors are rotated at a speed several times greater than the speed of movement of the conditioning rotor over the ground so that the conditioning action is one of abrasion and scraping across the crop surfaces by the brush tufts during acceleration of the crop by the rotors. To this conditioning treatment is added a spiking treatment in the overlapping zon between the two rotors.

In some operating conditions the crop spiking effect of the brush rotor is enhanced if the packing rotor is made up of ribs having straight leading edges. In place of a brush type lower rotor, types of rotor as shown in FIGS. 4 and 7 may be used, the former particularly when the conditioner is fitted directly onto a mower.

By making provision to move rotor 12 further away from the centre of rotor 11, the conditioning effect can be moderated. At a spacing when there is no longer an overlap between the two rotors, the need to drive both rotors in synchronisation no longer exists. If a difference in circumferential speed is introduced by changing the drive ratio, the crop passing between the rotors is subjected to a more severe scrubbing action. This effect has been found to be particularly pronounced when the peripheral speed of feeding rotor 12 is less than that of pick-up rotor 11.

With both rotors set apart a further variation is to drive feed rotor 12 in the same direction of rotation as the pick-up rotor 11. When both rotors co-rotate, a particularly severe and effective form of conditioning is achieved. It is most probably due to the crop, after its first acceleration by rotor 11, being thrown into the path of secondary rotor 12; this decelerates and immediately re-accelerates the herbage material, forcing it into a new path defined by the front housing 15. It is these speed and directional changes which cause the surface damage to the crop. By spacing the rotors even further apart so that a substantial gap is created between them, a proportion of the crop can be allowed to pass straight through without being re-directed by the secondary rotor 12. It is a particular advantage that crop permitted to pass through the gap originates in the lower swath region and has been exposed most to the conditioning effect of the pick-up rotor during the first acceleration.

Returning now to consideration of the overall arrangement shown in FIG. 11, the arrangement of the hood portion 17, and roller 18, together with the overall configuration, gives rise to a suction effect upwardly behind the front baffle 17 between the baffle and the primary upwardly rotaing rotor 11. To achieve this, the baffle 17 is arranged to be a pivoted, height variable baffle at the front of the machine, and an optional sealing brush 17A may be provided between the hood 15 and the secondary rotor 12. The effect of these two, together with the ground roller 18, is to at least partially seal the routes of normal air ingress and thus to reduce air pressure above the crop at the front, so as to assist the lifting.

FIG. 14 shows in side view a modification of the arrangement of FIG. 11, in which the feeding rotor 12 comprises a plain cylindrical rotor, for example, of steel or plastics material, which holds the crop against the conditioning rotor 11, and also slows the crop flow. The rotor 12 may be freely rotating or braked or driven at a different speed and/or in a different direction from the conditioning rotor 11. Essentially such a feed rotor 12 is a non-clogging rotary device for holding the crop in contact with the spike tips of the conditioning rotor 12 and for retarding the crop flow. FIG. 15 shows a diagrammatic view along the arrow A in FIG. 14.

FIG. 16 shows a modification of the arrangement of FIG. 11 in which the feeding rotor 12 has a number of transverse ribs 23 or rows 20 of fins 24, and is rotated at a speed of rotation such that two ribs 23 or rows 20 of fins enter each gap between succeeding rows 20 of brush tufts 19 during the synchronised rotation. Pairs of ribs 23 or rows of fins 24 straddle a row of conditioning tufts 19 and press the crop particularly effectively against the tufts at their leading and trailing edges in rapid succession.

FIGS. 17(a), 17(b) and 17(c) show a major modification of the arrangements shown in the preceding Figures, in that the elongate formations 20 of the rotor elements on one rotor 12 are circumferential formations formed generally in planes transverse to the direction of the axes of the rotors, instead of lateral formations as have been described in the previous Figures. In FIGS. 17(a), (b) and (c) elements corresponding to elements shown in preceding Figures are indicated by like reference numerals. Referring firstly to FIG. 17a, the apparatus comprises a first, conditioning, rotor 11 and a second, feeding, rotor 12, the rotors being positioned in similar relationship to that shown in FIG. 11, with the feeding rotor 12 positioned at a higher level than the conditioning rotor 11 and by way of example forwardly of the conditioning rotor. The feeding rotor 12 comprises a plurality of discs 21 spaced apart along the axis of the rotor and orientated generally perpendicular to the axis of the rotor 12. The outer perimeter of each disc 21 is notched or serrated.

The spaced discs 21 on the rotor 12 are also shown in FIG. 17(b) which is a diagrammatic perspective view along the direction of the arrow A in FIG. 11. Conveniently the discs 21 are cut from synthetic plastics sheet material and are secured along a tubular drum-like core 22 of the rotor 12.

As shown in FIG. 17(b), the conditioning rotor 11 is formed of a series of right-angle bars 34 extending parallel to the axis of the rotor 11 and spaced angularly round the rotor. Each angle bar 24 carries a number of conditioning elements 24 each of which consists of a short elongate outwardly directed conditioning element generally in the shape of a fin and having a pointed outer end. Each conditioning element 24 can conveniently be cut from synthetic plastics sheet material or can be moulded, and is arranged with the width of the elongate fin generally transverse to the direction of crop flow. A main modification of the embodiment of FIGS. 17(a) and 17(b) over that of FIG. 11 is that the conditioning elements 24 on the rotor 11 are arranged in a formation of spaced apart circumferential rows indicated diagrammatically by broken lines 25. It will be seen that in the embodiment of FIG. 17(b), the spaced apart rows 25 form part of a helix of conditioning elements 24 which winds around the conditioning rotor 11, with appropriate lateral gaps for the discs 21 to register. However in other embodiments the conditioning elements 24 may be arranged in discrete spaced apart rows each of which follows the path of a circle around the axis of the rotor 11 so that the plane of the row of conditioning elements 24 is generally perpendicular to the axis of the rotor 11. In FIG. 17(c) there is shown a diagrammatic development of the envelope of the rotor 11 showing how the conditioning devices 24 intrude into the spaces between the discs 21 on the rotor 12 at progressively displaced positions between adjacent discs.

It is to be understood that the feed rotor 12 can be placed into other positions relative to pick-up rotor 11. For example it may be fitted in the 12 o'clock, or top-dead-centre position, or in the 1, 2 or 3 o'clock positions.

It is a particular feature of the present invention, in its broadest aspect, that the crop engaging rotor 12 shown in FIG. 17(a), may find use in other applications in addition to the twin rotor conditioner shown in that Figure. For example the crop engaging rotor 12 may be used as a pick-up rotor for collecting cut crop lying on the ground, and alternatively, or in addition, may be used as a crop conditioning rotor operating without any further co-operating conditioning rotor. For example the rotor 12 may be positioned in close proximity to the ground for picking up cut crop lying on the ground, and the rotor may be covered by a hood means providing a channel for crop to be carried up and over the rotor 12 and deposited back on the ground for drying. In such circumstances the crop may be conditioned by relative movement between the rotor 12 and the crop during acceleration of the crop when engaged by the rotor. To impede the acceleration and free flow of crop engaged by the rotor, and so increase the conditioning effect, stationary crop engaging elements may be fitted transversely underneath the hood means.

Returning now to consideration of the embodiment shown in FIG. 17(a), the discs 21 are inter-digitated with the conditioning elements 24 along the axis of the rotor, so that the discs 21 press the crop against the conditioning elements 24 by a lateral packing action at intervals across the conditioning rotor, in contrast to the peripheral packing action of the embodiment of FIG. 1. In the embodiment of FIG. 17(a), the feed rotor 12 need not be driven at all, may be fitted with a simple braking device, or can be a driven rotor which is driven faster or slower than the conditioning rotor 11 or in the opposite direction to it. The disc spacing on the feed roller 12 can be narrower to match alternative patterns of elements on the conditioning rotor. Across the width of the rotor, the disc spacing can be varied at different positions, for example the discs 21 can be closer in areas of consistently heavy crop flow. For example, where a rotor is positioned across a series of pairs of counter rotating disc cutters, crop flow will be heavier where counter rotating discs draw the cut crop together, and here the discs 21 may be positioned closer together. Thus the disc spacing on the feed rotor 12 may have a direct relationship to the volume of crop flowing in specific areas across the width of the rotor.

In other arrangements, for example as described with reference to FIGS. 14 and 15 to eliminate the lateral intermittency of the discs 21, feed rotor 12 can be constructed in the form of a full-width roller, for example of continuous cylindrical surface, for forcing and holding cut crop against a closely adjacent conditioning rotor.

FIG. 18 shows a modification of the embodiment of FIG. 17(a), in which the pick-up rotor 11 is made up of a series of spaced-apart discs and the fin form crop conditioning elements 24 are replaced by brush tufts 19 of the kind described with regard to FIG. 11 and attached to alternate sides of individual discs 19. The discs 21 of the feeding rotor 12 are shaped by way of example with octagonal perimeters in place of the serrated perimeters shown in FIG. 17(a).

In FIGS. 19(a) and 19(b) there is shown a further modification of the embodiment shown in FIG. 18 in which the secondary rotor 12 is positioned to the rear of the pick-up and conditioning rotor 11, and is shown as being rotated in the same sense as the conditioning rotor 11. The effect is that the secondary rotor 12 strips the crop positively off the conditioning/pick-up rotor so that no stray material is driven downwardly into the stubble. FIG. 19(a) is a diagrammatic side view of the apparatus, and FIG. 19(b) shows a diagrammatic view from the front of the apparatus in the direction of the arrow A.

FIGS. 20(a) and 20(b) show a modification of the preceding embodiment in which a co-rotating secondary stripping rotor 12 interdigitates with pointed-fin shaped crop engaging elements arranged in transverse rows on the conditioning/pick-up rotor 11. The rotor 12 comprises a series of discs 21 spaced apart along the length of the axis of the rotor, and each disc has its periphery shaped with a series of lobes 26.

In FIG. 21 there is shown a further modification in which the principles of packing or feeding crop into a conditioning rotor by a feed rotor is achieved by a pair of co-operating rotors having identical construction. FIG. 21 merely shows a detail of two such rotors, but illustrates the principle involved. In FIG. 21 a series of conditioning elements 10 combine aspects of both the fin-form elements 21 and rib-form element 23 previously described. The combined form elements are referred to as elements 130 and are formed by cutting a castellated and optionally serrated shape from a sheet of thick stiff material 131, which is mounted in a channel section 132 forming part of a first rotor on the apparatus. The channel 132 forms one of a series of angularly spaced bars corresponding to bars in other embodiments indicated at 34 positioned parallel to the axis of the rotor in the form of a squirrel cage. A series of conditioning elements 133 of similar construction formed from a sheet of material 134 are mounted on a second rotor in similar manner to the first, the two rotors being positioned so that the conditioning elements 133 and 130 inter-digitate along the transverse length of the rotors, and are in register where the sheets approach each other during rotation in synchronism of the two rotors. It will be appreciated that two such rotors achieve both lateral and peripheral packing of the crop between the rotors by the effect of the sheets 131 and 134, and by the effect of the castellated conditioning elements 130 and 133 along the length of the sheets. It will be further appreciated that individual castellations need not be parallel sided laterally but can be tapered, that is converging from a broad base towards a narrower distal edge.

The crop engaging element of FIG. 21 is also illustrated in cross-section in FIG. 21(a). In both figures the radial springs 135 and sliding provision for the transverse ribs can be seen. If an excessive amount of crop or a foreign object becomes entrapped between opposing ribs, either or both may move momentarily towards the rotor centre by virtue of slots 138 in the ribs, to allow passage of the obstruction without damage to the rotor. Set bolt 137 passing through a collar 136, which is slightly longer than the thickness of the rib material, can be tightened in different positions within slot 139 in the channel 132. This determines the working clearance between pairs of opposing ribs and the amount of rib deflection possible. Radial adjustment of the set bolt is an optional feature, as is the accurate phasing of opposing ribs. If the ribs are not castellated but parallel sided with serrated distal edge, and the two rotors are driven so that the ribs thereof are out of phase to a variable degree with a substantial radial overlap, then the crop stream is subjected to treatment by abrasion, splitting, spiking and bending.

It is to be appreciated that many variations of the arrangement shown in FIG. 21 are available, for example there may be different numbers of sheet constructions 131 and 134 on the two rotors, or the same number on the two rotors. Recesses for the crop engaging elements may be formed by means other than a parallel-sided channel section, and the coil springs shown may be replaced by leaf or band springs or by non-metallic resilient elements or known damping means. The crop engaging element of FIGS. 21 and 21a is equally suitable for use as a pick-up rotor and a crop conditioning rotor.

One variation of the embodiment of FIGS. 21 and 21(a) is shown in FIG. 21(b). Here a rib-like crop engaging element 200 extends transversely across the principal direction of crop flow 5, the rib-like element being shown diagrammatically in cross-section in FIG. 21(b). The base of the element 200 has a series of triangular fins 201 set across the rib 200 at right angles thereto, and the base region of the rib 200 and the fins 201 are mounted in a housing 203 having sloping side walls matching the edges of the fins 201. The riblike element 200 is maintained in an outward position by a resilient bias means 202 consisting of a hollow tube of rubber or other elastomeric material which is deformed by inward movement of the base of the element 200. The rubber tube 202 may run along the length of the housing 203. The effect of the cooperation between the sloping walls of the housing 203 and the fins 201 is two fold. First, the fins 201 centre the rib 200 in a required outward direction. Second, if the rib 200 strikes an object likely to cause damage, the rib 200 can deflect inwards against the action of the bias means 202, and in addition can tilt in or against the direction of crop flow.

The embodiments of both FIGS. 21, 21(a) and 21(b) are shown only diagrammatically, and in practice there will normally be made provision for substantially greater amounts of radial deflection than shown in the drawings.

In FIG. 22 a rotor 11, referred to particularly in this and following embodiments as rotor 40 with individual crop engaging elements 41 is shown lifting a crop and delivering it into an auger feed mechanism 42 as used on forage harvesters and some balers. An advantage of a pick-up rotor of this kind is that the crop engaging elements can be so spaced on their mounting means that all the ground beneath the rotor is swept at least once per rotor rotation, and the high peripheral speed thins out and evens out the crop windrow. The interface between the rotor 40 and subsequent processing machinery 42 is very important. It is particularly advantageous to guide the crop so that it meets the auger 42 from the front-dead-centre position downwards, and this can be achieved by crop guide bars shown in broken outline at 46a. In front of the auger a funnel is created between the auger flights 48 and the auger trough 44 for the crop to enter readily. The leading edge of the auger trough 44 is formed by a roller 45 which may be driven to avoid crop accumulations. A vertical gap between the rotor cover 46 and auger cover 47 allows the operator to see whether or not the feed mechanism is functioning correctly.

FIG. 23 shows a modified form of the apparatus of FIG. 16. In FIG. 23 the feed roller 45 at the leading edge of the auger trough 44 is considerably larger in diameter and, by being octagonal in cross-section, is more positive as a crop conveying device. At the same time it acts as a stripping means for the pick-up rotor 40. An alternative cross-section of an intermediate rotor 45 is shown in FIG. 23a. The four flexible paddles secured in the manner shown in FIG. 23a to a central square section shaft 49 also give positive stripping and conveying, but afford a degree of flexibility if uneven feeding should occur or an unwanted solid object be encountered. FIG. 24 shows the arrangement of FIG. 23 in plan view.

As previously stated the advantages of angling the crop engaging portions of individual elements relative to the transverse rotor axis are that when used on pick-up rotors the elements can be used to concentrate the crop stream, or to tease out laterally the crop stream, depending upon the sense of inclination of the elements. In FIG. 25 an arrangement is shown from the front in which the elements attached to a rotor 40 are angled in opposite directions in each half of the rotor. If a heap-shaped windrow is picked up centrally by this rotor, then the orientation of the elements will cause a lateral teasing out effect to be obtained. This effect can be further enhanced by fitting guide vanes 50 to the underside of the front and top section of the rotor cover 46 in the manner indicated in the rear view of FIG. 19(b). The overall effect of these measures individually or in combination is improved transverse distribution of the crop between the intake at the lower front position and the exit from the rotor hoursing. This has the advantage that, should it be desired to spray chemicals such as hay preservatives onto the crop at harvesting, for example by spray nozzles 51, a more uniform distribution is achieved.

Another advantage of angling the crop engaging elements relative to the transverse rotor axis is illustrated in FIG. 26, in side view only. If the elements are angled in the opposite directions to those shown in FIG. 25 then crop, even if it lies scattered in the field, will be conveyed towards the centre of the rotor 40 as it pases through the pick-up unit. As a result the crop can be fed into a longitudinal auger such as 52 or other type of conveyor positioned centrally behind the pick-up unit. Guide vanes in the form of a V or open V, this time with the apex trailing, will also enhance the gathering effect.

If it is desired to first spread the crop for mixing additives therewith, and then to convey it into a harvesting machine, an arrangement such as shown in FIG. 27 may be used. FIG. 27 shows a side view of a combination of pick-up rotor 40 and auger 52. With the angles of the crop engaging elements 41 set to spread crop, the crop is picked up spread outwardly by the pick up rotor 40. Behind the pick-up rotor 40, the crop is gathered and moved inwardly, into the path of a central longitudinal conveying auger or other type of conveyor 52, by a subsidiary transverse collecting auger or augers 53.

Reference will now be made to FIGS. 28 and 29, which show various configurations of rotors and crop engaging elements which find application in many of the embodiments described hereinbefore.

FIGS. 29(a) to 29(d) show diagrammatically a summary of the modes of operation which are possible with counter-rotating twin-rotor crop conditioning systems. In each case two rotors 11 and 12 carry crop engaging elements 10. Conveniently the crop engaging elements may be ribs, or fins, or any other of the crop engaging elements which have been described hereinbefore. For convenience, the case will be described where the crop engaging elements 10 are ribs. In FIG. 29(a) the ribs 10 are shown to be perfectly aligned along the axis common to both rotors 11 and 12. The effect on crop trapped between two opposing ribs is that it is compressed and consequently bruised. In FIG. 20(b) the two rotors are slightly out oi phase. If the ribs are parallel sided, then the crop will be sharply bent, stretched and scratched. In FIG. 29(c) the ribs on one rotor intermesh centrally between pairs of ribs of the other. Treatment will be more gentle than that described in FIGS. 29(a) and 29(b) above. The essential feature of FIG. 29(d) is that the ribs or other conditioning elements are reclined at their tips in the direction of rotation, and this may have advantages, particularly vis a vis FIG. 29(a) in respect of the severity of crop treatment and the possibility of foreign objects becoming trapped between opposing ribs; entrapped crop or objects are more likely to cause angular deflection of the ribs or elements.

FIG. 28 shows a development of a configuration of crop engaging elements 10 on support bars 34 of a rotor 11. Suitable crop engaging elements to constitute the elements 10 would be twisted crop engaging fins such as are shown, for example, in the previous FIGS. 2 to 5. The eifect of the layout of FIG. 30 is either to gather or to spread out crop, depending upon the sense of rotation of the rotor.

Figure 30B:
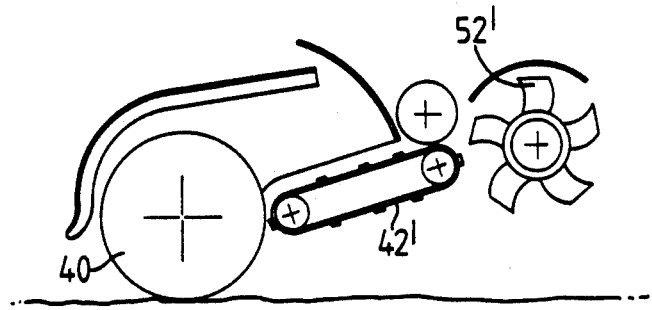

Referring now to FIGS. 30(a) and 30(b) there is shown an arrangement of a crop gathering pick-up rotor generally of the kind which has been described in FIGS. 22 to 27. In FIGS. 30(a) and 30(b) a pick-up rotor 40 collects crop from the ground and passes it to a belt conveyor 42' which takes the place of the auger 42 in the previous arrangements. The belt conveyor 42' then passes the crop to a chopping mechanism 52'. A major advantage of the crop gathering pick-up rotor of FIGS. 30(a) and (b) is that the conventional transverse auger mechanism can be completely omitted, which results in design simplification and consequent cost saving, in that it is a system highly suited to forage harvesters and balers.

Returning now to consideration of general aspects of the present invention, reference has been made to both ribs and fins, as suitable forms of crop engaging elements. However il is to be appreciated that crop engaging elements may also be provided in accordance with some aspects of the invention, in which the width of the element is equal to the length. In some aspects, the distinction between crop engaging elements of a rib like nature and crop engaging elements of a fin like nature, may lie in that the former may be regarded as transversely or circumferentially continuous, whereas the latter may be regarded as being intermittent outwardly extending elements.

With regard to dimensions and other data which may be adopted in constructing embodiments of the present invention, as a general rule the data given in our co-pending British Patent Application No. 8012426 relating to rotor diameters, tip and peripheral speeds, clearances and extent of overlap, and so on, are appropriate also to the rotors which have been described in the present specification. Suitable materials for the crop engaging elements are, for example, polyethylene, nylon, and polypropylene. Depending on the various applications illustrated in the Figures, rotor diameters may vary from approximatel 0.3 to 1.0 m diameter, the preferred range being 0.4 to 0.6 m diameter. Tip speeds of the crop engaging elements may vary within the approximate range of 3 to 30 m/s, mainly 10 to 23 m/s.

I claim:

1. Apparatus for conditioning crop comprising
   a mobile frame for movement across the ground,
   a rotor mounted for rotation about an axis substantially parrallel to the ground for picking up and conditioning crop, the rotor comprising support means and a plurality of outwardly extending crop engaging elements mounted on said support means for picking up and conditioning crop,
   hood extending at least around part of the front half of the rotor and forming with the rotor a crop flow passage between the rotor and the hood along which crop is conveyed by the rotor, and
   drive means for driving the rotor in rotation in a sense such that the rotor picks up crop and carries the crop upwardly and rearwardly over the rotor, said drive means being arranged to drive the rotor in rotation at a speed such that at least at the region where the crop is picked up, the crop engaging elements move faster than the crop being conveyed, and the rotor accelerates the crop by lifting it against the resistance provided by said hood, said drive means being arranged to drive said rotor in rotation at a speed sufficient to release crop from the crop engaging elements at the rear of the rotor at least predominantly by centrifugal effect,
   each crop engaging element being formed of stiff resilient material and being arranged to be resiliently yieldable upon encountering an abnormal load, the resilience being sufficient for the elements to be capable of returning after yielding to their undeflected dispositions at least predominantly by virtue of the resilience and without sole reliance on centrifugal effect,
   each crop engaging element comprising a rib-like element extending transversely across the direction of crop flow and having a principal plane which traverses the general direction of crop flow, the said rib-like elements being spaced circumferentially around the perimeter of the rotor, and there being provided sufficient number of the rib-like elements for the crop to be engaged at any one time by a plurality of the circumferentially spaced rib-like elements presented to the crop along the crop flow passage,
   each rib-like element having deep serrations along its outer edge so as to a plurality of outwardly directed elongate teeth, each elongate tooth having side edges which converge towards each other in the outward direction to facilitate intrusion into the crop layer and subsequent detachment of the crop under centrifugal effect whilst at the same time preventing material from reaching and wrapping in the core region of the rotor.

2. Apparatus according to claim 1 including
   localised yielding means for providing said yielding movement of the crop engaging element at least predominantly at a region spaced from the distal crop engaging region of the element,
   localised yielding means comprising coupling means which secures said rib-like crop engaging element to said support means and which allows movement between said element and said support means, and resilient biassing means which biasses said rib-like element towards an outwardly extending operating position,
   said support means including a rigid support member which extends outwardly from said rotor, each rib-like crop engaging element being a generally flat element having its principal plane lying in normal operation substantially in a radial plane containing the axis of the rotor, and each said element being secured to a co-operating flat surface on said rigid support member which extends outwardly from the rotor, said rigid element being secured to said rigid support member by said coupling means which passes through said crop engaging element and said support member, said resilient biassing means acting to bias said rib-like element towards said flat surface, and said rib-like element being yieldable by a rocking motion away from said flat surface against the effect of said biassing means.

* * * * *